US012752880B2

(12) United States Patent
Kitahara et al.

(10) Patent No.: US 12,752,880 B2
(45) Date of Patent: Oct. 6, 2026

(54) HUMAN-POWERED VEHICLE COMPONENT

(71) Applicant: Shimano Inc., Sakai (JP)

(72) Inventors: Kosuke Kitahara, Sakai (JP); Takaaki Fujiwara, Sakai (JP); Shinichiro Noda, Sakai (JP)

(73) Assignee: Shimano Inc., Osaka (JP)

( * ) Notice: Subject to any disclaimer, the term of this patent is extended or adjusted under 35 U.S.C. 154(b) by 539 days.

(21) Appl. No.: 16/371,841

(22) Filed: Apr. 1, 2019

(65) Prior Publication Data

US 2019/0308689 A1 Oct. 10, 2019

(30) Foreign Application Priority Data

Apr. 6, 2018 (JP) ................................. 2018-073860

(51) Int. Cl.

*B62M 1/36* (2013.01)
*B62M 3/00* (2006.01)
*B62M 6/55* (2010.01)

(52) U.S. Cl.

CPC ................. *B62M 1/36* (2013.01); *B62M 6/55* (2013.01)

(58) Field of Classification Search

CPC .......... B62M 1/36; B62M 3/003; B62M 6/55; B62M 3/00; B62M 9/02
USPC .......................................... 280/259; 74/594.2
See application file for complete search history.

(56) References Cited

U.S. PATENT DOCUMENTS

| | | | | |
|---|---|---|---|---|
| 4,259,880 A | | 4/1981 | Ueno | |
| 4,728,218 A | * | 3/1988 | Durham | F16D 1/0864 74/594.1 |
| 5,954,614 A | * | 9/1999 | Yoo | B62M 1/36 475/294 |
| 6,276,234 B1 | * | 8/2001 | Harrington | B62M 3/003 74/594.1 |
| 7,258,041 B2 | * | 8/2007 | Yamanaka | B62M 3/003 74/594.2 |
| 7,770,682 B2 | * | 8/2010 | Spanski | B62K 11/00 180/206.4 |
| 8,438,947 B2 | * | 5/2013 | Yamanaka | B62M 3/003 74/594.1 |
| 8,616,085 B2 | * | 12/2013 | Nonoshita | B62M 3/003 74/594.2 |

(Continued)

FOREIGN PATENT DOCUMENTS

| | | |
|---|---|---|
| CN | 2139553 Y | 8/1993 |
| CN | 2377169 Y | 5/2000 |

(Continued)

*Primary Examiner* — Anne Marie M Boehler
(74) *Attorney, Agent, or Firm* — Spencer Fane, LLP

(57) ABSTRACT

A human-powered vehicle component includes a crankshaft including a rotational center axis and a first coupling portion that allows a crank arm to be coupled and a transmission provided on the crankshaft and including a second coupling portion that allows a sprocket to be coupled. The first coupling portion includes a first positioning portion that determines a first predetermined relative phase position of the crank arm with respect to the crankshaft in a circumferential direction about the rotational center axis. The second coupling portion includes a second positioning portion that determines a second predetermined relative phase position of the sprocket with respect to the crankshaft in the circumferential direction about the rotational center axis.

15 Claims, 16 Drawing Sheets

(56) References Cited

U.S. PATENT DOCUMENTS

| | | | | |
|---|---|---|---|---|
| 8,904,905 | B2 * | 12/2014 | Onogi | B62M 3/16 74/594.1 |
| 9,381,972 | B2 * | 7/2016 | Kawakami | B62M 6/55 |
| 9,718,514 | B2 * | 8/2017 | Kawakami | B62M 6/50 |
| 10,093,389 | B2 * | 10/2018 | Emura | B62M 9/105 |
| 10,190,659 | B2 * | 1/2019 | Fukumori | B62M 9/00 |
| 10,315,727 | B2 * | 6/2019 | Nishimoto | F16H 55/30 |
| 2004/0200314 | A1 * | 10/2004 | Hermansen | B62M 3/00 74/594.1 |
| 2005/0040699 | A1 * | 2/2005 | Chiang | B62M 3/00 301/124.1 |
| 2006/0117905 | A1 * | 6/2006 | Yamanaka | B62M 3/00 74/594.1 |
| 2006/0288818 | A1 * | 12/2006 | Meggiolan | B62K 19/34 74/594.1 |
| 2007/0137428 | A1 * | 6/2007 | Yamanaka | B62M 3/00 74/594.4 |
| 2007/0283781 | A1 * | 12/2007 | Meggiolan | B62M 3/003 74/594.1 |
| 2008/0056635 | A1 * | 3/2008 | Lee | F16C 19/54 384/545 |
| 2008/0164673 | A1 * | 7/2008 | Lane | B62M 3/003 280/259 |
| 2008/0236293 | A1 * | 10/2008 | Meggiolan | B62M 3/003 73/794 |
| 2010/0220947 | A1 * | 9/2010 | Earle | B62M 3/003 384/458 |
| 2011/0011201 | A1 | 1/2011 | Kao | |
| 2014/0166384 | A1 * | 6/2014 | Ishida | B62M 6/50 180/206.3 |
| 2015/0329170 | A1 * | 11/2015 | Kondo | B62M 3/003 74/594.1 |
| 2016/0185419 | A1 * | 6/2016 | Bendel | G01L 5/225 180/220 |
| 2016/0288872 | A1 * | 10/2016 | Shahana | B62M 11/145 |
| 2017/0167542 | A1 * | 6/2017 | Hara | F16H 55/30 |
| 2017/0283003 | A1 * | 10/2017 | Stählin | B62M 6/45 |
| 2017/0343047 | A1 * | 11/2017 | Chen | F16D 1/0847 |
| 2018/0100617 | A1 * | 4/2018 | Forrest | A47H 1/022 |
| 2018/0297664 | A1 * | 10/2018 | Fukumori | B62M 9/10 |
| 2018/0354580 | A1 * | 12/2018 | Hara | B62M 1/36 |
| 2019/0233051 | A1 * | 8/2019 | Carrasco Vergara | B62M 9/08 |
| 2020/0361566 | A1 * | 11/2020 | He | F16D 41/30 |
| 2021/0039744 | A1 * | 2/2021 | Cheng | B62J 45/41 |

FOREIGN PATENT DOCUMENTS

| | | | | | |
|---|---|---|---|---|---|
| CN | 101104434 | A | | 1/2008 | |
| CN | 103687784 | A | * | 3/2014 | G06F 1/1632 |
| CN | 104837722 | A | | 8/2015 | |
| CN | 206691312 | U | * | 12/2017 | B62M 6/55 |
| DE | 696 08 752 | T2 | | 11/2000 | |
| DE | 10216940 | A1 | * | 11/2003 | B62M 3/003 |
| DE | 10 2011 077 903 | A1 | | 12/2012 | |
| DE | 10 2013 209 262 | A1 | | 11/2014 | |
| DE | 20 2017 103 331 | U1 | | 9/2017 | |
| DE | 102018119497 | A1 | * | 2/2019 | B62M 6/50 |
| DE | 102018202418 | A1 | * | 8/2019 | B62M 6/55 |
| EP | 1331167 | A1 | * | 7/2003 | B62M 1/36 |
| EP | 2 143 628 | B1 | | 3/2014 | |
| EP | 2939916 | A1 | * | 11/2015 | B62M 6/55 |
| FR | 2780698 | A1 | * | 1/2000 | B62M 3/003 |
| GB | 2532799 | A | * | 6/2016 | B62M 3/003 |
| JP | 54-83244 | A | | 7/1979 | |
| JP | 57-128585 | U | | 8/1982 | |
| JP | 2016-78618 | A | | 5/2016 | |
| KR | 100386851 | B1 | * | 6/2003 | |
| KR | 100777794 | B1 | * | 11/2007 | |
| KR | 10 2014 0114221 | A | | 9/2014 | |
| KR | 101527581 | B1 | * | 6/2015 | |
| TW | 200418684 | A | | 10/2004 | |
| WO | WO-2014103212 | A1 | * | 7/2014 | B62M 6/55 |

* cited by examiner

HUMAN-POWERED VEHICLE COMPONENT

CROSS-REFERENCE TO RELATED APPLICATIONS

This application claims priority to Japanese Patent Application No. 2018-073860, filed on Apr. 6, 2018. The entire disclosure of Japanese Patent Application No. 2018-073860 is hereby incorporated herein by reference.

BACKGROUND

Technical Field

The present invention generally relates to a human-powered vehicle component.

Background Information

Japanese Laid-Open Patent Publication No. 2016-078618 discloses a bicycle assist unit that includes a crankshaft, a front sprocket, and a crank arm. The front sprocket and the crank arm are coupled to the crankshaft.

SUMMARY

The prior art does not disclose a specific structure of the bicycle assist unit that determines a relative position of the crank arm and the sprocket.

One object of the present disclosure is to provide a human-powered vehicle component that easily determines a relative position of a crank arm and a sprocket.

A human-powered vehicle component according to a first aspect of the present disclosure comprises a crankshaft including a rotational center axis and a first coupling portion that allows a crank arm to be coupled and a transmission provided on the crankshaft and including a second coupling portion that allows a sprocket to be coupled. The first coupling portion includes a first positioning portion that determines a first predetermined relative phase position of the crank arm with respect to the crankshaft in a circumferential direction about the rotational center axis. The second coupling portion includes a second positioning portion that determines a second predetermined relative phase position of the sprocket with respect to the crankshaft in the circumferential direction about the rotational center axis.

According to the human-powered vehicle component of the first aspect, the relative phase position of the crank arm with respect to the crankshaft and the relative phase position of the sprocket with respect to the crankshaft are predetermined. This determines a unique relative position of the crank arm and the sprocket. Thus, the relative position of the crank arm and the sprocket is easily determined.

In accordance with a second aspect of the present disclosure, the human-powered vehicle component according to the first aspect is configured so that the crank arm includes at least one of a recess and a projection. The first positioning portion includes at least the other one of the recess and the projection engaged with the at least one of the recess and the projection.

According to the human-powered vehicle component of the second aspect, relative rotation of the crank arm and the crankshaft is appropriately prevented.

In accordance with a third aspect of the present disclosure, the human-powered vehicle component according to the first or second aspect is configured so that the sprocket includes at least one of a recess and a projection. The second positioning portion includes at least the other one of the recess and the projection engaged with the at least one of the recess and the projection.

According to the human-powered vehicle component of the third aspect, relative rotation of the transmission and the sprocket is appropriately prevented.

In accordance with a fourth aspect of the present disclosure, the human-powered vehicle component according to any one of the first to third aspects is configured so that the first positioning portion includes a first mark.

According to the human-powered vehicle component of the fourth aspect, as the first mark is visually checked, the crankshaft can be coupled to the crank arm. Thus, the crank arm is easily coupled to the crankshaft in the first relative phase position.

In accordance with a fifth aspect of the present disclosure, the human-powered vehicle component according to the fourth aspect is configured so that the first mark includes at least one of a first imprint and a first print.

According to the human-powered vehicle component of the fifth aspect, as at least one of the first imprint and the first print is visually checked, the crankshaft can be coupled to the crank arm. Thus, the crank arm is easily coupled to the crankshaft in the first relative phase position.

In accordance with a sixth aspect of the present disclosure, the human-powered vehicle component according to any one of the first to fifth aspects is configured so that the second positioning portion includes a second mark.

According to the human-powered vehicle component of the sixth aspect, as the second index is visually checked, the crankshaft can be coupled to the sprocket. Thus, the sprocket is easily coupled to the crankshaft in the second relative phase position.

In accordance with a seventh aspect of the present disclosure, the human-powered vehicle component according to the sixth aspect is configured so that the second mark includes at least one of a second imprint and a second print.

According to the human-powered vehicle component of the seventh aspect, as at least one of the second imprint and the second print is visually checked, the crankshaft can be coupled to the sprocket. Thus, the sprocket is easily coupled to the crankshaft in the second relative phase position.

In accordance with an eighth aspect of the present disclosure, the human-powered vehicle component according to any one of the first to seventh aspects is configured so that the first coupling portion and the second coupling portion are spaced apart in an axial direction of the crankshaft.

According to the human-powered vehicle component of the eighth aspect, the structure of a portion of the crank arm coupled to the first coupling portion is simplified.

In accordance with a ninth aspect of the present disclosure, the human-powered vehicle component according to any one of the first to eighth aspects is configured so that the transmission is a member separate from the crankshaft.

According to the human-powered vehicle component of the ninth aspect, a complex structure of the crankshaft is avoided.

In accordance with a tenth aspect of the present disclosure, the human-powered vehicle component according to the ninth aspect is configured so that the transmission is a hollow member.

According to the human-powered vehicle component of the tenth aspect, the transmission member is reduced in weight.

In accordance with an eleventh aspect of the present disclosure, the human-powered vehicle component according to any one of the first to eighth aspects is configured so that the transmission is directly formed on an outer surface of the crankshaft.

According to the human-powered vehicle component of the eleventh aspect, the number of parts in the human-powered vehicle component is reduced.

In accordance with a twelfth aspect of the present disclosure, the human-powered vehicle component according to the ninth or tenth aspect is configured so that the crankshaft further includes a third coupling portion that allows the transmission to be coupled.

According to the human-powered vehicle component of the twelfth aspect, the transmission member is directly coupled to the crankshaft.

In accordance with a thirteenth aspect of the present disclosure, the human-powered vehicle component according to the twelfth aspect is configured so that the third coupling portion includes a third positioning portion that determines a predetermined third relative phase position of the transmission with respect to the crankshaft in the circumferential direction about the rotational center axis.

According to the human-powered vehicle component of the thirteenth aspect, the relative phase position of the transmission with respect to the crankshaft is set to the predetermined position.

In accordance with a fourteenth aspect of the present disclosure, the human-powered vehicle component according to the thirteenth aspect is configured so that the transmission includes at least one of a recess and a projection. The third positioning portion includes at least the other one of the recess and the projection engaged with the at least one of the recess and the projection.

According to the human-powered vehicle component of the fourteenth aspect, power is appropriately transmitted from the transmission to the crankshaft.

In accordance with a fifteenth aspect of the present disclosure, the human-powered vehicle component according to the thirteenth or fourteenth aspect is configured so that the third positioning portion includes a third mark.

According to the human-powered vehicle component of the fifteenth aspect, as the third mark is visually checked, the crankshaft can be coupled to the transmission. Thus, the transmission is easily coupled to the crankshaft in the third relative phase position.

In accordance with a sixteenth aspect of the present disclosure, the human-powered vehicle component according to the fifteenth aspect is configured so that the third mark includes at least one of a third imprint and a third print.

According to the human-powered vehicle component of the sixteenth aspect, as at least one of the third imprint and the third print is visually checked, the crankshaft can be coupled to the transmission. Thus, the transmission is easily coupled to the crankshaft in the third relative phase position.

In accordance with a seventeenth aspect of the present disclosure, the human-powered vehicle component according to any one of the first to sixteenth aspects further comprises a housing that rotatably supports the crankshaft.

According to the human-powered vehicle component of the seventeenth aspect, the housing appropriately supports the crankshaft.

In accordance with an eighteenth aspect of the present disclosure, the human-powered vehicle component according to the seventeenth aspect further comprises a motor that assists propulsion of a human-powered vehicle. The motor is provided at the housing and configured to drive the transmission.

According to the human-powered vehicle component of the eighteenth aspect, driving force of the motor is transmitted to the transmission to assist propulsion of a human-powered vehicle.

In accordance with a nineteenth aspect of the present disclosure, the human-powered vehicle component according to any one of the first to eighteenth aspects is configured so that the sprocket includes a first sprocket and a second sprocket having a smaller diameter than the first sprocket. At least one of the first sprocket and the second sprocket includes at least one shift region that facilitates movement of a chain between the first sprocket and the second sprocket.

According to the human-powered vehicle component of the nineteenth aspect, the chain smoothly moves between the first sprocket and the second sprocket through the shift region.

In accordance with a twentieth aspect of the present disclosure, the human-powered vehicle component according to the nineteenth aspect is configured so that in a state in which the crank arm is coupled to the first coupling portion so that the crank arm is located at the first predetermined relative phase position with respect to the crankshaft in the circumferential direction about the rotational center axis and the sprocket is coupled to the second coupling portion so that the sprocket is located at the second predetermined relative phase position with respect to the crankshaft in the circumferential direction about the rotational center axis, as viewed in a direction parallel to the rotational center axis, the shift region is located in at least one of a position proximate to the crank arm and a position proximate to a position separated by 180° from the crank arm in the circumferential direction about the rotational center axis.

According to the human-powered vehicle component of the twentieth aspect, in a case in which the crank arm is located in top dead center or bottom dead center, the chain smoothly moves between the first sprocket and the second sprocket.

The human-powered vehicle component of the present disclosure easily determines a relative position of a crank arm and a sprocket.

BRIEF DESCRIPTION OF THE DRAWINGS

Referring now to the attached drawings which form a part of this original disclosure.

DETAILED DESCRIPTION OF EMBODIMENTS

Figure 1:
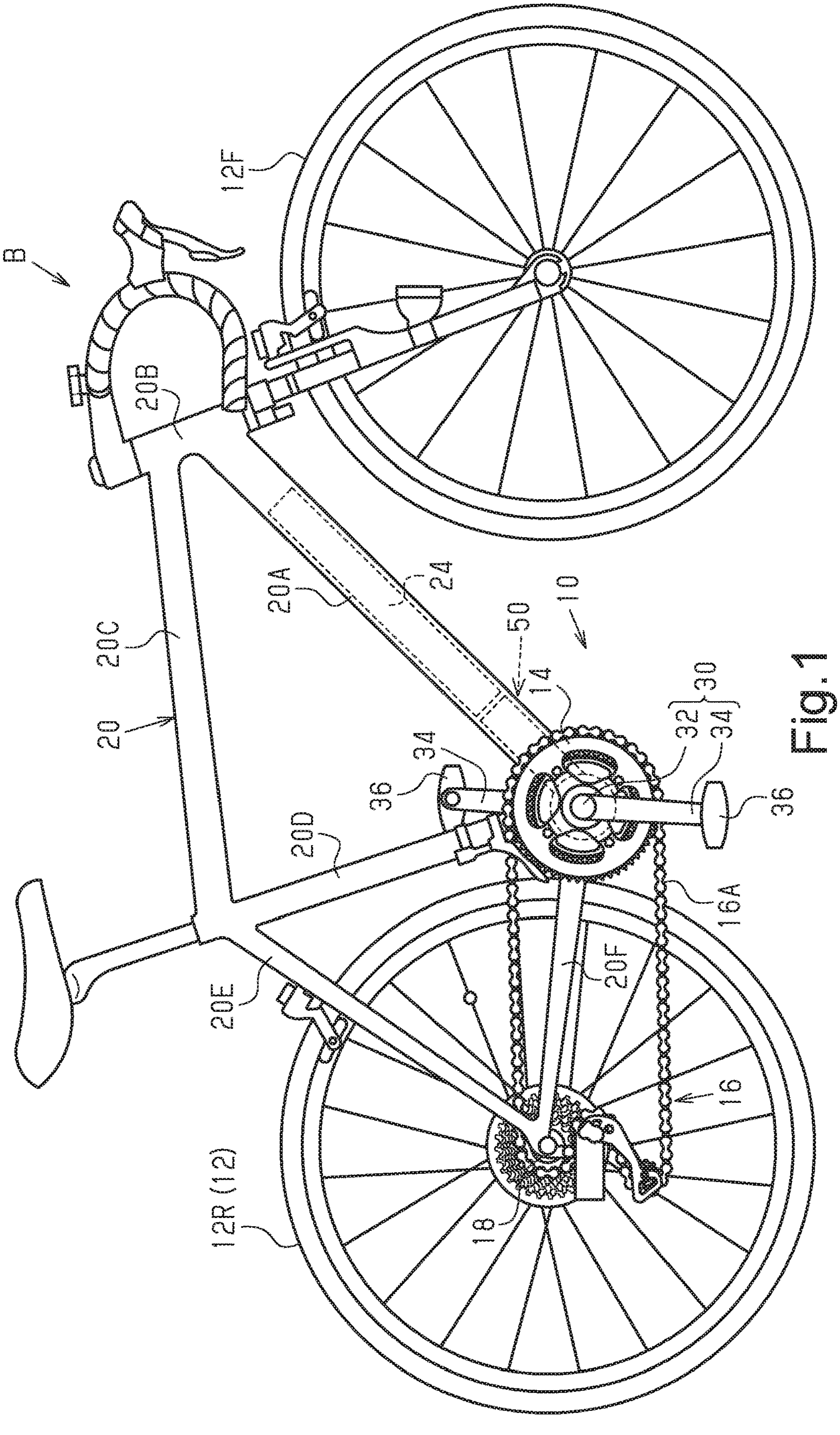
FIG. 1 is a side elevational view of a human-powered vehicle including a human-powered vehicle component in accordance with one illustrated embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

A human-powered vehicle B including an embodiment of a human-powered vehicle component 50 will now be described with reference to FIG. 1. In the description hereafter, the human-powered vehicle component 50 will simply be referred to as the component 50. The human-powered vehicle B is a vehicle that can be driven by at least human driving force. The human-powered vehicle B includes, for example, a bicycle. The number of wheels in the human-powered vehicle B is not limited. The human-powered vehicle B includes, for example, a monocycle and a vehicle including three or more wheels. The bicycle includes, for example, various types of bicycles such as a mountain bike, a road bike, a city bike, a cargo bike, and a recumbent bike and an electric assist bicycle (E-bike). In the embodiment, the human-powered vehicle B refers to a bicycle.

The human-powered vehicle B includes a frame 20, a crank 30, a drive mechanism 10, and a drive wheel 12. Human driving force is input to the crank 30. The crank 30 includes a crankshaft 32 rotatable relative to the frame 20 and a crank arm 34 provided on each of the opposite ends of the crankshaft 32. A pedal 36 is coupled to each of the crank arms 34. The drive wheel 12 is supported by the frame 20. The crank 30 and the drive wheel 12 are coupled by the drive mechanism 10. The drive mechanism 10 includes a sprocket 14 coupled to the crankshaft 32. The drive mechanism 10 further includes a coupling member 16 and a sprocket 18. The coupling member 16 transmits rotational force of the sprocket 14 to the sprocket 18. The coupling member 16 includes, for example, a chain, a belt, or a shaft. In the present embodiment, the coupling member 16 includes a chain 16A.

The sprocket 18 is coupled to the drive wheel 12. Preferably, a one-way clutch is provided between the sprocket 18 and the drive wheel 12. The one-way clutch is configured to allow forward rotation of the drive wheel 12 in a case in which the sprocket 18 rotates forward and prohibit rearward rotation of the drive wheel 12 in a case in which the sprocket 18 rotates rearward. In the present embodiment, the sprocket 14 includes a front sprocket. The sprocket 18 includes a rear sprocket. In the description hereafter, the front sprocket is simply referred to as the sprocket 14.

The human-powered vehicle B includes a front wheel 12F and a rear wheel 12R. In the following embodiment, the rear wheel 12R refers to the drive wheel 12. However, the front wheel 12F can be the drive wheel 12. The frame 20 includes a down tube 20A. The frame 20 further includes a head tube 20B, a top tube 20C, a seat tube 20D, a seatstay 20E, and a chainstay 20F.

Figure 2:
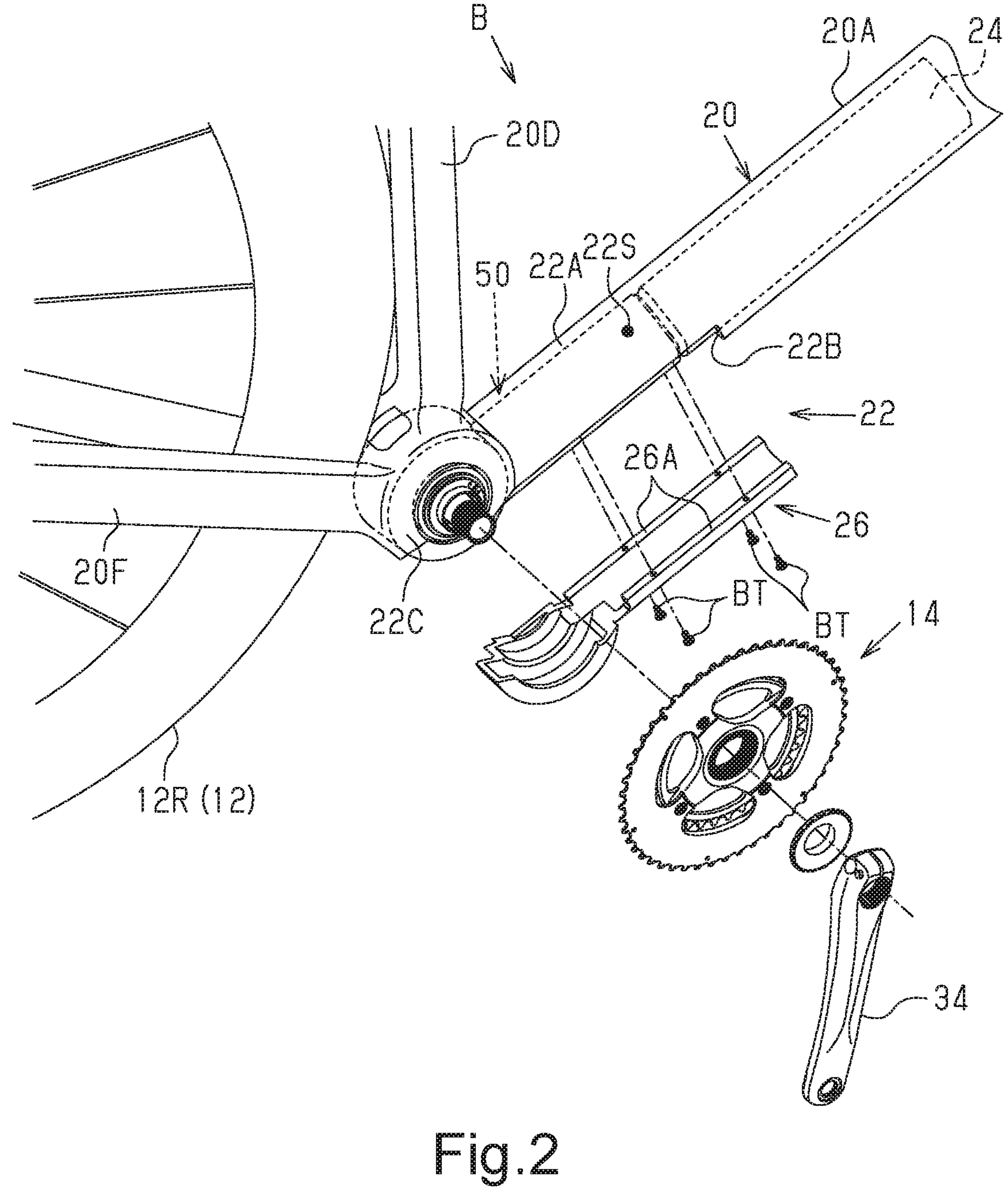
FIG. 2 is a perspective view of a portion of the human-powered vehicle shown in FIG. 1 in the vicinity of a crankshaft.

As shown in FIGS. 1 and 2, the human-powered vehicle B includes a battery 24. The component 50 and the battery 24 are coupled to the frame 20. In one example, the component 50 is at least partially accommodated in the frame 20 of the human-powered vehicle B. Preferably, the battery 24 is at least partially accommodated in the frame 20 of the human-powered vehicle B. In the present embodiment, the battery 24 is entirely accommodated in the frame 20 of the human-powered vehicle B. In the present embodiment, the battery 24 is entirely accommodated in the down tube 20A. The battery 24 can be accommodated in the seat tube 20D, the top tube 20C (refer to FIG. 1), the seatstay 20E (refer to FIG. 1), or the chainstay 20F. The battery 24 can have divided configurations and can be accommodated in at least two of the down tube 20A, the seat tube 20D, the top tube 20C, the seatstay 20E, and the chainstay 20F.

As shown in FIG. 2, the frame 20 includes an attaching portion 22 into which at least a portion of the component 50 is inserted. The attaching portion 22 is at least partially provided on the down tube 20A. The attaching portion 22 includes a circumferential wall 22A, an opening 22B, and a connector 22C. The attaching portion 22 includes an accommodation space 22S for the component 50 and the battery 24.

The circumferential wall 22A includes a portion of the down tube 20A. The circumferential wall 22A is arranged in a lower end of the down tube 20A. In FIG. 2, the opening 22B is open to a lower side of the human-powered vehicle B. The opening 22B is arranged in the lower end of the down tube 20A. The connector 22C is provided on the lower end of the down tube 20A. The seat tube 20D and the chainstay 20F are connected to the connector 22C. Preferably, the connector 22C is formed integrally with the seat tube 20D and the chainstay 20F. However, the connector 22C can be connected to the seat tube 20D and the chainstay 20F through welding or adhesion.

The frame 20 further includes a cover 26. The cover 26 closes at least a portion of the opening 22B. Preferably, the cover 26 closes the entire opening 22B. The cover 26 includes a frame attachment 26A attachable to at least one of the opening 22B and the component 50. The frame attachment 26A includes, for example, holes into which bolts BT are insertable. The bolts BT are inserted through holes in the frame attachment 26A and coupled to threaded holes provided at the attaching portion 22 around the opening 22B so that the cover 26 is attached to the opening 22B. The attachment of the cover 26 to the opening 22B accommodates the entire component 50 in the down tube 20A and the connector 22C.

As shown in FIG. 2, the component 50 and the battery 24 are coupled to each other and accommodated in the accommodation space 22S of the frame 20. The component 50 and the battery 24 can be physically and electrically coupled. The component 50 and the battery 24 can be separately arranged and electrically connected by an electric cable.

Figure 3:
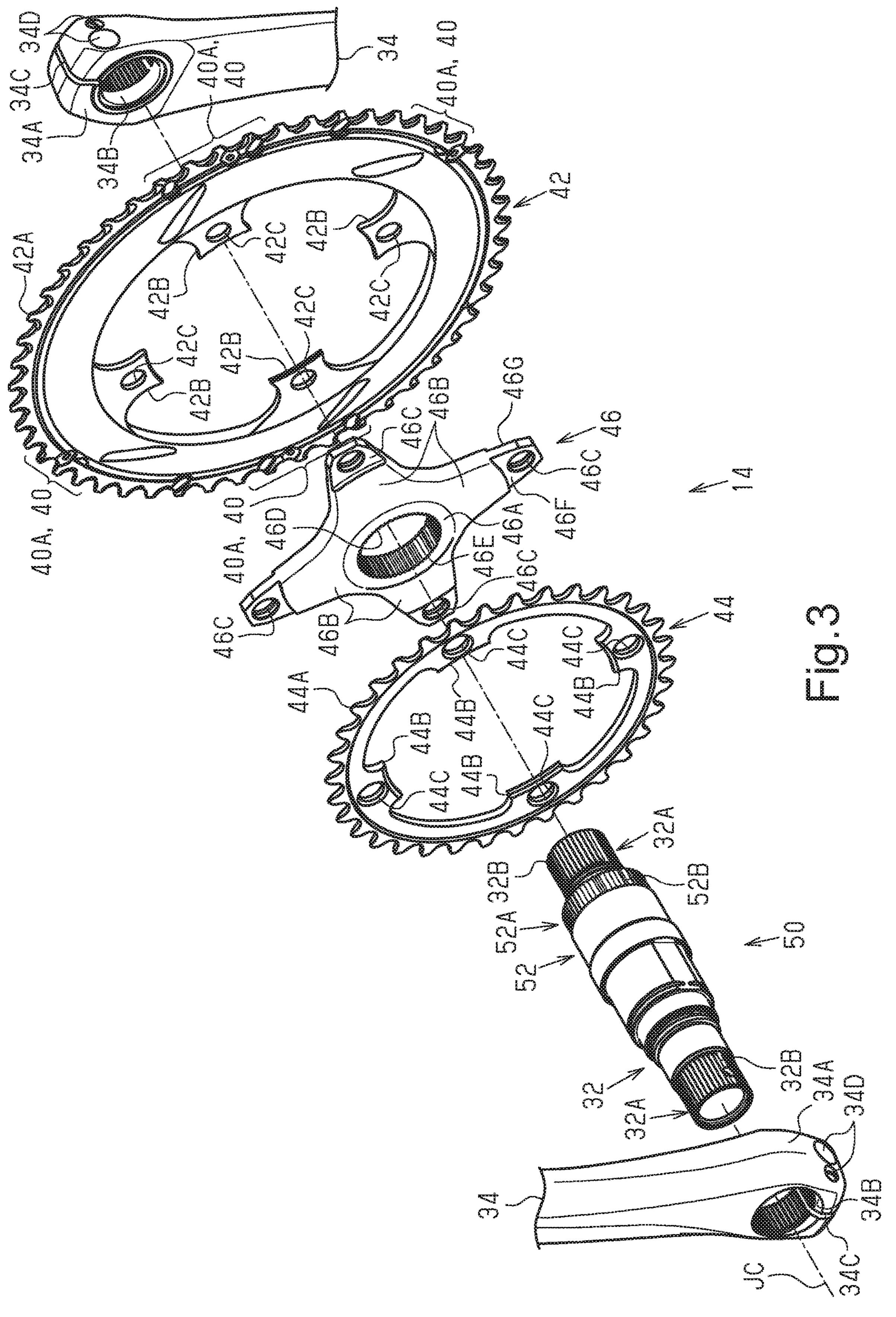
FIG. 3 is an exploded perspective view of a crankshaft, a pair of crank arms, and a pair of sprockets of the human-powered vehicle shown in FIG. 1.

As shown in FIG. 3, the component 50 includes the crankshaft 32 and a transmission 52 that is to be provided on the crankshaft 32. The transmission 52 is a single force transmitting part in the illustrated embodiment. However, the transmission 52 can be several individual parts that are coupled together. The crankshaft 32 that has a rotational center axis JC. The crankshaft 32 includes a pair of first coupling portions 32A. The first coupling portions 32A allow the crank arms 34 to be coupled to the crankshaft 32. The transmission 52 includes a second coupling portion 52A allows a sprocket 14 to be coupled to the transmission 52. Each of the first coupling portions 32A includes a first positioning portion 32B that determines a first predetermined relative phase position of the crank arm 34 with respect to the crankshaft 32 in a circumferential direction about the rotational center axis JC. The second coupling portion 52A includes a second positioning portion 52B that determines a second predetermined relative phase position of the sprocket 14 with respect to the crankshaft 32 in the circumferential direction about the rotational center axis JC. The first coupling portions 32A and the second coupling portion 52A are spaced apart in the axial direction of the crankshaft 32. In one example, the first coupling portions 32A are provided on opposite ends of the crankshaft 32 in the axial direction. The second coupling portion 52A is provided on a first end of the transmission 52 in a direction extending along the rotational center axis JC. The second coupling portion 52A is located between the two of the first coupling portions 32A in a direction extending along the rotational center axis JC. More specifically, the second coupling portion 52A is located toward one of the first coupling portions 32A from a central position of the crankshaft 32 in the axial direction. In the present embodiment, the crankshaft 32 is hollow but can be solid.

Each of the crank arms 34 includes at least one of a recess and a projection. Each of the first positioning portions 32B includes at least the other one of the recess and the projection engaged with the at least one of the recess and the projection of the crank arm 34. The sprocket 14 includes at least one of a recess and a projection. The second positioning portion 52B includes at least the other one of the recess and the projection engaged with the at least one of the recess and the projection of the sprocket 14.

In one example, each of the crank arms 34 includes a coupling portion 34A coupled to the crankshaft 32. The coupling portion 34A includes a through hole 34B, a slit 34C and two holes 34. The crankshaft 32 is inserted into the through hole 34B. The slit 34C is in communication with the through hole 34B. The holes 34D are configured to receive bolts (not shown) for fastening the crankshaft 32 and the crank arms 34 with the bolts (not shown). The slit 34C extends in an end of the crank arm 34 in a direction in which the crank arm 34 extends. The holes 34D include through holes extending through the end of the crank arm 34 in a direction orthogonal to the direction in which the crank arm 34 extends and the direction in which the through hole 34B extends. The holes 34D are in communication with the slit 34C.

Figure 4:
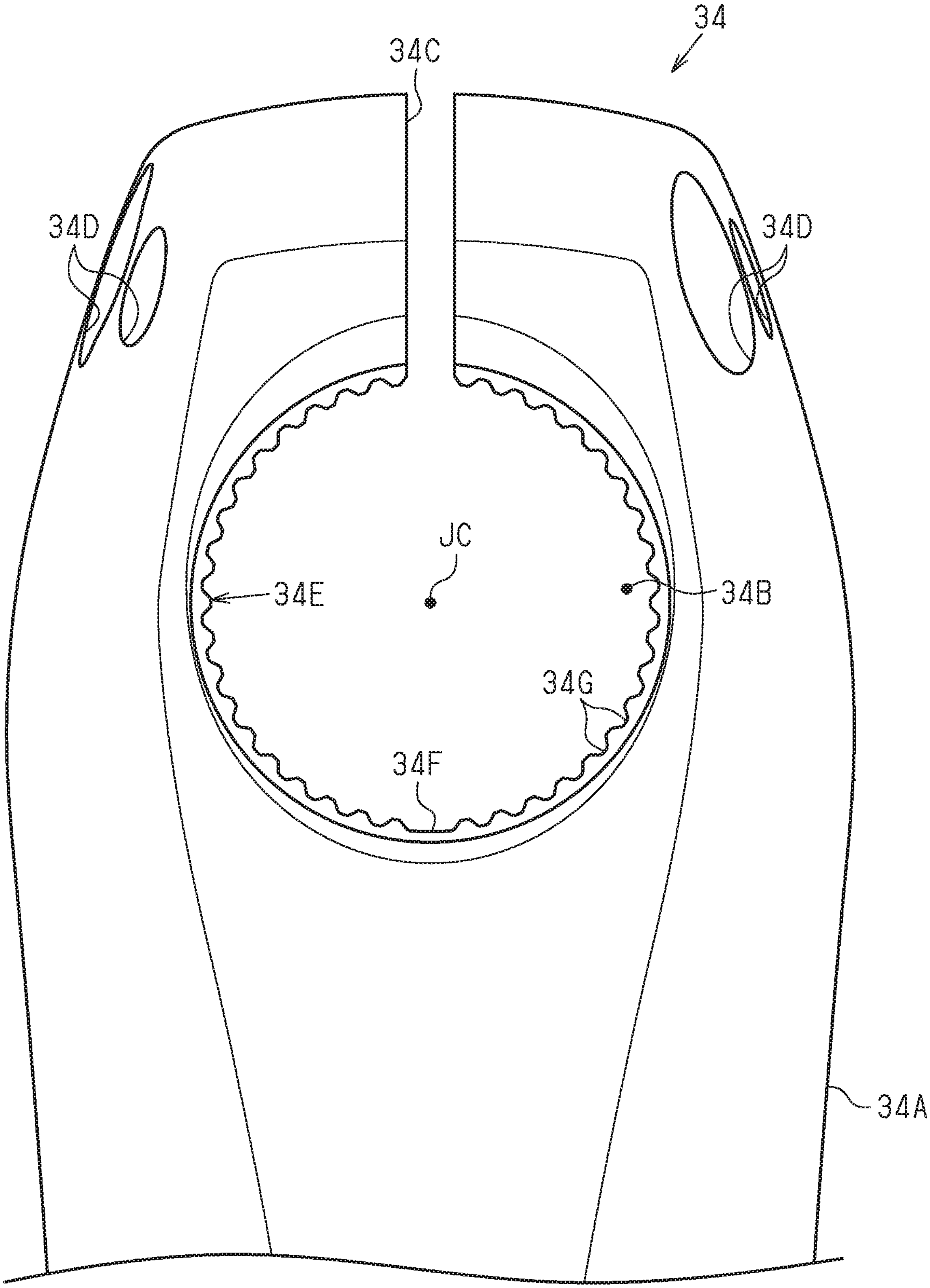
FIG. 4 is an enlarged side elevational view showing a portion of the crank arm that is configured to be coupled to the crankshaft shown in FIG. 2.

As shown in FIG. 4, the wall surface of the coupling portion 34A defining the through hole 34B includes a serration 34E as one example of the at least one of the recess and the projection of the crank arm 34. In the present embodiment, the serration 34E includes a plurality of recesses extending along the rotational center axis JC. Preferably, the recesses of the serration 34E are arranged on the entire circumference in the circumferential direction about the rotational center axis JC. The recesses of the serration 34E include a plurality of first recesses 34G and a second recess 34F. The first recesses 34G are arranged at a predetermined pitch in the circumferential direction about the rotational center axis JC. The second recess 34F is wider than the first recesses 34G about the rotational center axis JC. In one example, the width of the second recess 34F is two times greater than the pitch of the first recesses 34G. In the circumferential direction about the rotational center axis JC, the second recess 34F is located at a position separated by 180° from the slit 34C about the rotational center axis JC of the crankshaft 32. The widths of the first recesses 34G and the second recess 34F and the position of the second recess 34F in the circumferential direction about the rotational center axis JC can be changed in any manner. The second recess 34F only needs to be configured to be visually distinguished from the first recesses 34G by a person who couples the crank arm 34 to the crankshaft 32.

Figure 5:
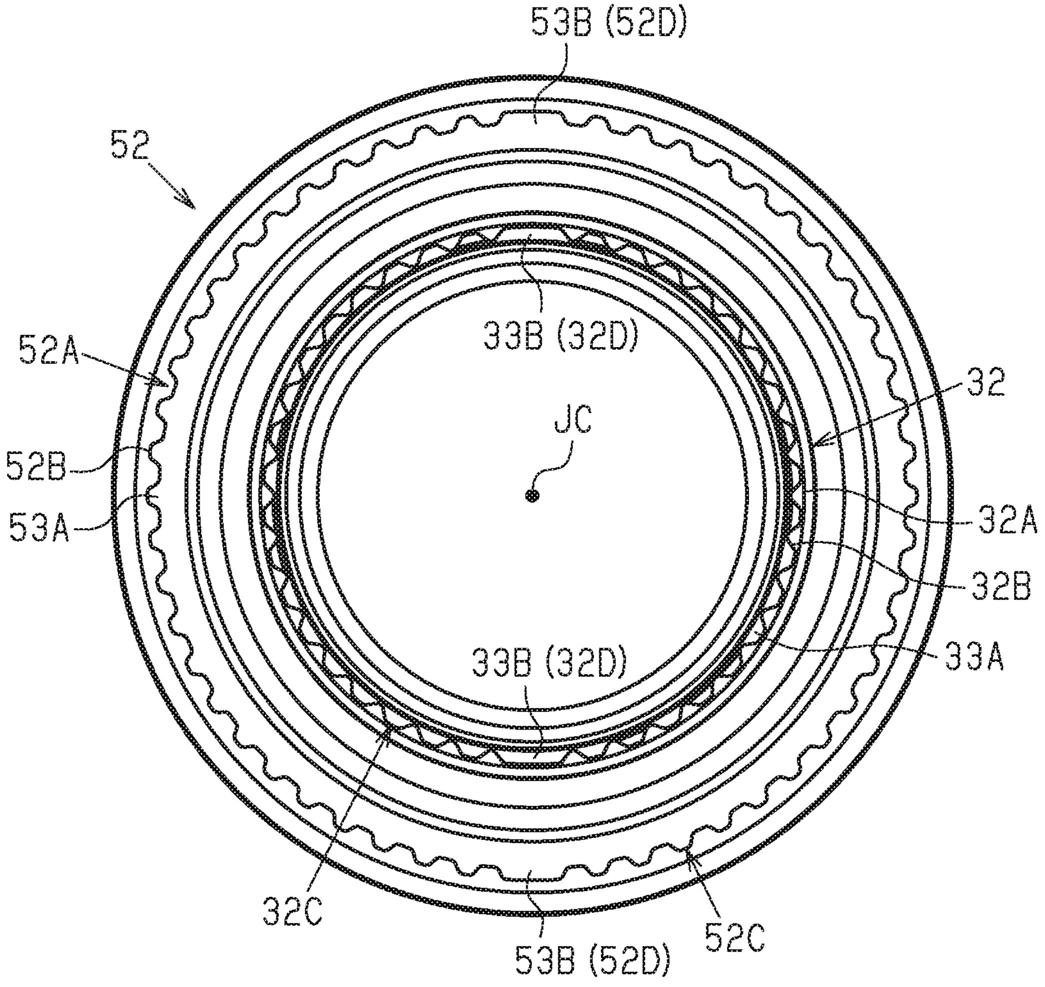
FIG. 5 is an axial view of the crankshaft and a transmission as viewed in a direction extending along a rotational center axis.

As shown in FIG. 5, the first positioning portion 32B of the crankshaft 32 includes a serration 32C engaged with the serration 34E of the crank arm 34 as one example of at least the other one of the recess and the projection engaged with the at least one of the recess and the projection of the crank arm 34. In the present embodiment, the serration 32C includes a plurality of projections extending along the rotational center axis JC. Preferably, the projections of the serration 32C are arranged on the entire circumference in the circumferential direction of the rotational center axis JC. The projections of the serration 32C include a plurality of first projections 33A and a pair of second projections 33B. The first projections 33A are arranged at a predetermined pitch in the circumferential direction about the rotational center axis JC. The second projections 33B are wider than the first projections 33A about the rotational center axis JC. The first positioning portion 32B includes a pair of first marks 32D. The first marks 32D include the second projections 33B. In one example, the second projections 33B are provided at two locations separated by 180° in the circumferential direction about the rotational center axis JC. In one example, the width of each of the second projections 33B is two times greater than the pitch of the first projections 33A. In a state in which the serration 32C of the first coupling portions 32A engages with the serration 34E of the crank arm 34, one of the second projections 33B engages with the second recess 34F (refer to FIG. 4) of the crank arm 34, and the other one of the second projections 33B engages with the slit 34C (refer to FIG. 4) of the crank arm 34. In a case in which the transmission 52 is coupled to an adapter 46 so that one of the second projections 33B engages with the second recess 34F of the crank arm 34, the position of the crank arm 34 with respect to the crankshaft 32 is set to the first relative phase position in the circumferential direction about the rotational center axis JC. One of the second projections 33B can be omitted, and the second recess 34F can be omitted from the crank arm 34. In this case, the other one of the second projections 33B engages with the slit 34C (refer to FIG. 4) of the crank arm 34.

As shown in FIG. 5, the second positioning portion 52B of the transmission 52 includes a serration 52C as one example of at least the other one of the recess and the projection engaged with the at least one of the recess and the projection of the sprocket 14. The outer diameter of the second positioning portion 52B is greater than the outer diameter of the first positioning portion 32B. In the present embodiment, the serration 52C includes a plurality of projections extending along the rotational center axis JC. Preferably, the projections of the serration 52C are arranged on the entire circumference in the circumferential direction about the rotational center axis JC. The projections of the serration 52C include first projections 53A arranged at a predetermined pitch in the circumferential direction about the rotational center axis JC and second projections 53B, which are wider than the first projections 53A about the rotational center axis JC. In one example, the pitch of the first projections 53A of the serration 52C is equal to the pitch of the first projections 33A of the serration 32C. The second positioning portion 52B includes second marks 52D. The second marks 52D include the second projections 53B. In one example, the second projections 53B are provided at two locations separated by 180° in the circumferential direction about the rotational center axis JC. The positions of the two second projections 53B of the second marks 52D conform to the positions of the two second projections 33B of the first marks 32D in the circumferential direction about the rotational center axis JC. In one example, the width of each second projection 53B is two times greater than the pitch of the first projections 53A.

The predetermined pitches of the first projections 33A and 53A of the serrations 32C and 52C can be changed in any manner. In one example, the pitch of the first projections 33A of the serration 32C can differ from the pitch of the first projections 53A of the serration 52C. The positions of the first marks 32D and the second marks 52D can be changed in any manner in the circumferential direction about the rotational center axis JC. In one example, the positions of the first marks 32D differ from the positions of the second marks 52D in the circumferential direction about the rotational center axis JC. The widths of the second projections 33B of the first marks 32D and the widths of the second projections 53B of the second marks 52D can be changed in any manner.

As shown in FIG. 3, the sprocket 14 includes a first sprocket 42 and a second sprocket 44 having a smaller diameter than the first sprocket 42. At least one of the first sprocket 42 and the second sprocket 44 includes at least one shift region 40 that facilitates movement of the chain 16A (refer to FIG. 1) between the first sprocket 42 and the second sprocket 44. In the present embodiment, the first sprocket 42 includes a plurality of shift regions 40.

The first sprocket 42 includes a plurality of teeth 42A around which the chain 16A runs and a plurality of attaching portions 42B. The teeth 42A are provided on an outer circumferential portion of the first sprocket 42. The attaching portions 42B are provided on an inner circumferential portion of the first sprocket 42. In the present embodiment, the first sprocket 42 includes four attaching portions 42B. The attaching portions 42B are arranged at equal intervals about the rotational center axis JC. The attaching portions 42B include holes 42C into which bolts (not shown) are inserted.

The second sprocket 44 includes a plurality of teeth 44A around which the chain 16A runs and a plurality of attaching portions 44B. The teeth 44A are provided on an outer circumferential portion of the second sprocket 44, and the attaching portions 44B are provided on an inner circumferential portion of the second sprocket 44. The second sprocket 44 has fewer teeth than the first sprocket 42. In the present embodiment, the second sprocket 44 includes four attaching portions 44B. The attaching portions 44B are arranged at equal intervals about the rotational center axis JC. The attaching portions 44B include holes 44C into which bolts (not shown) are inserted.

As shown in FIG. 3, the sprocket 14 further includes the adapter 46 to which the first sprocket 42 and the second sprocket 44 are coupled. The adapter 46 includes a first side surface 46F and a second side surface 46G in the rotational center axis JC. The first side surface 46F is located closer to the frame 20 than the second side surface 46G. The first sprocket 42 is coupled to the second side surface 46G of the adapter 46. The second sprocket 44 is coupled to the first side surface 46F of the adapter 46.

The adapter 46 includes a coupling portion 46A and a plurality of arms 46B. In the present embodiment, the adapter 46 includes four of the arms 46B. In the present embodiment, the arms 46B are arranged at equal intervals about the rotational center axis JC. The arms 46B can be arranged at non-equal intervals about the rotational center axis JC. Each of the arm 46B has a distal end including a hole 46C into which a bolt (not shown) is inserted to fasten the first sprocket 42 and the second sprocket 44 to the adapter 46. More specifically, in a state in which the first sprocket 42 and the second sprocket 44 are coupled to the adapter 46 so that the holes 42C in the first sprocket 42, the holes 44C in the second sprocket 44, and the holes 46C in the adapter 46 are arranged at the same positions in the circumferential direction about the rotational center axis JC, the bolts are inserted into the holes 42C, 44C, and 46C. The first sprocket 42, the second sprocket 44, and the adapter 46 are held between the heads of the bolts and nuts. This fastens the first sprocket 42 and the second sprocket 44 to the adapter 46.

The coupling portion 46A is configured to be coupled to the transmission 52. The coupling portion 46A includes a through hole 46D into which the crankshaft 32 is inserted. The wall surface of the coupling portion 46A defining the through hole 46D includes a serration 46E as one example of at least one of the recess and the projection of the sprocket 14. The serration 46E is configured to engage with the serration 52C (refer to FIG. 3) of the transmission 52. In the present embodiment, the serration 46E includes a plurality of recesses extending along the rotational center axis JC. Preferably, the recesses of the serration 46E are arranged on the entire circumference in the circumferential direction about the rotational center axis JC.

Figure 6:
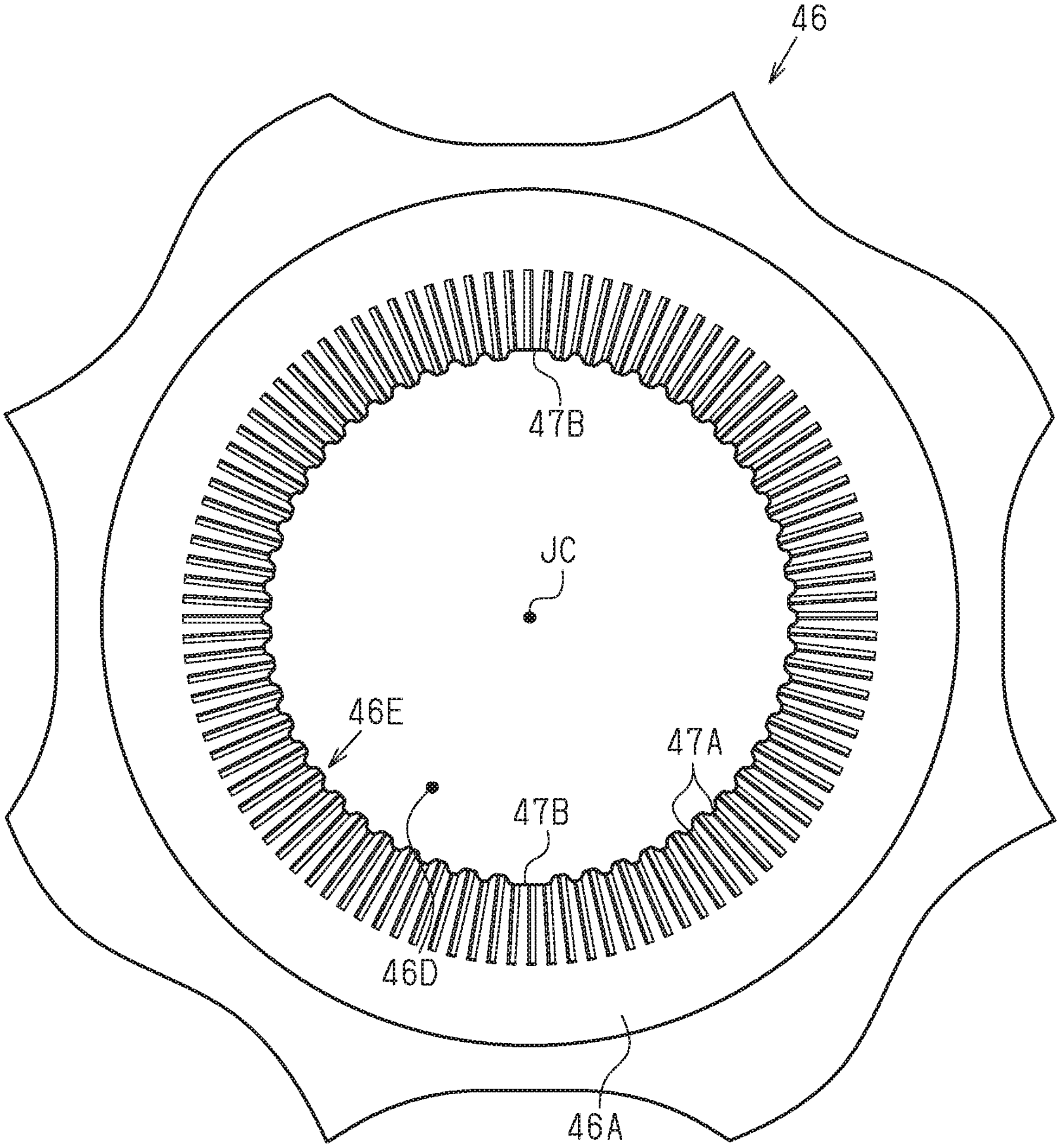
FIG. 6 is an enlarged side elevational view of a portion of the sprocket that is configured to be coupled to the crankshaft shown in FIG. 2.

As shown in FIG. 6, the recesses of the serration 46E include a plurality of first recesses 47A and a pair of second recesses 47B. The first recesses 47A are arranged at a predetermined pitch in the circumferential direction about the rotational center axis JC. The second recesses 47B are wider than the first recesses 47A about the rotational center axis JC. In one example, the width of each of the second recesses 47B is two times greater than the pitch of the first recesses 47A. In the circumferential direction about the rotational center axis JC, the second recesses 47B are arranged at positions separated by 180° in the circumferential direction about the rotational center axis JC of the crankshaft 32. The widths of the first recesses 47A and the second recesses 47B and the positions of the second recesses 47B in the circumferential direction about the rotational center axis JC can be changed in any manner. The second recesses 47B only need to be configured to be visually distinguished from the first recesses 47A by a person who couples the sprocket 14 to the transmission 52.

In a state in which the serration 46E of the adapter 46 engages with the serration 52C of the transmission 52, the second projections 53B, which are included in the second marks 52D of the second positioning portion 52B, engage with the second recesses 47B of the adapter 46. In a case in which the transmission 52 is coupled to the adapter 46 so that one of the two second projections 53B of the second marks 52D engages with one of the two second recesses 47B and the other one of the two second projections 53B engages with the other one of the two second recesses 47B, the position of the sprocket 14 with respect to the crankshaft 32 is set to the second relative phase position in the circumferential direction about the rotational center axis JC. Also, in a case in which the transmission 52 is coupled to the adapter 46 so that the other one of the two second projections 53B of the second marks 52D engages with one of the two second recesses 47B and one of the two second projections 53B engages with the other one of the two second recesses 47B, the position of the sprocket 14 with respect to the crankshaft 32 is set to the second relative phase position in the circumferential direction about the rotational center axis JC. One of the second projections 53B can be omitted, and one of the second recesses 47B can be omitted from the adapter 46.

Figure 7:
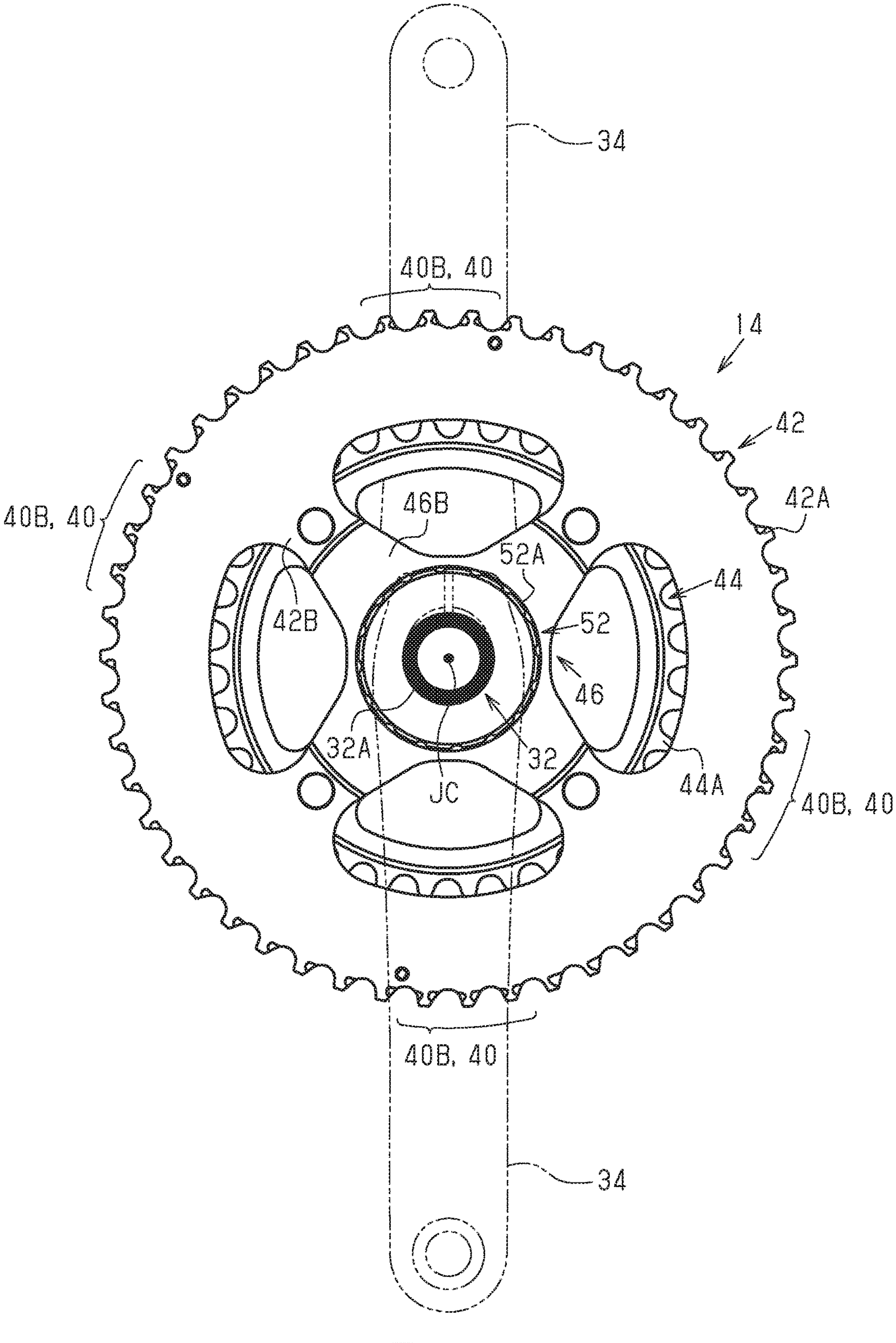
FIG. 7 is a side elevational view showing the positional relationship of the crank arms and the sprocket in a circumferential direction about the rotational center axis.

FIG. 7 shows the crank arms 34 and the sprocket 14 that are in a state in which the crank arms 34 are coupled to the first coupling portions 32A so that the crank arms 34 are located at the first relative phase position with respect to the crankshaft 32 in the circumferential direction about the rotational center axis JC, and the sprocket 14 is coupled to the second coupling portion 52A so that the sprocket 14 is located at the second relative phase position with respect to the crankshaft 32 in the circumferential direction about the rotational center axis JC. Preferably, as viewed in a direction parallel to the rotational center axis JC, at least one of the shift regions 40 is located in at least one of a position proximate to the crank arm 34 and a position proximate to a position separated by 180° from the crank arm 34 in the circumferential direction about the rotational center axis JC. As seen in FIGS. 3 and 7, the shift regions 40 include a plurality of first shift regions 40A and a plurality of second shift regions 40B. The first shift regions 40A facilitate movement of the chain 16A from the second sprocket 44 to the first sprocket 42. The second shift regions 40B facilitate movement of the chain 16A from the first sprocket 42 to the second sprocket 44. Preferably, as viewed in a direction parallel to the rotational center axis JC, at least one of the second shift regions 40B is located in at least one of a position proximate to the crank arm 34 and a position proximate to a position separated by 180° from the crank arm 34 in the circumferential direction about the rotational center axis JC.

Figure 8:
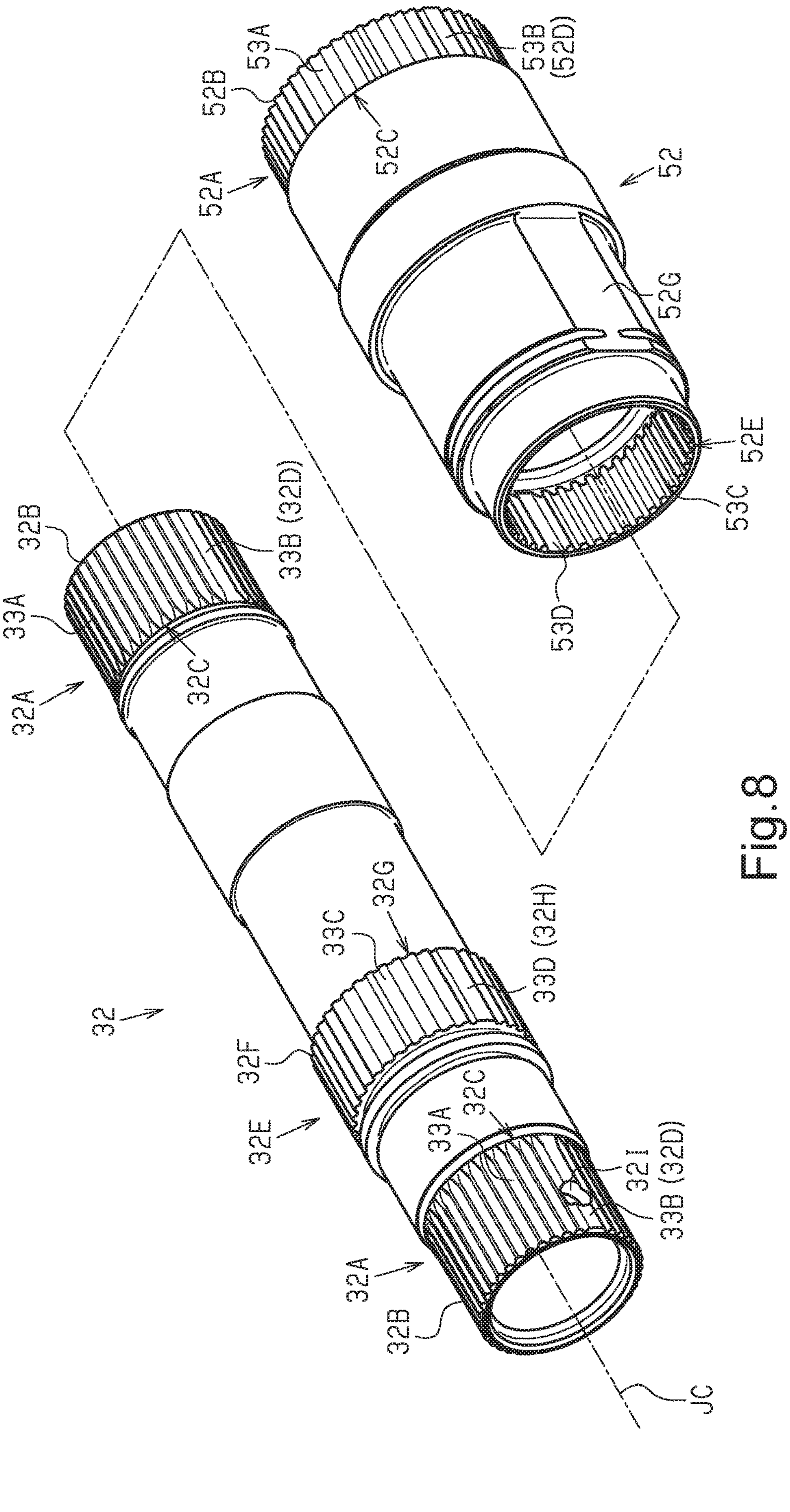
FIG. 8 is an exploded perspective view of the crankshaft and the transmission shown in FIG. 3.

As shown in FIG. 8, the transmission 52 of the present embodiment is a member separate from the crankshaft 32. The transmission 52 of the present embodiment is a one-piece member. The transmission 52 is a hollow member. The transmission 52 is coupled to the crankshaft 32 so as to be coaxial with the crankshaft 32. The crankshaft 32 further includes a third coupling portion 32E that allows the transmission 52 to be coupled. The third coupling portion 32E includes a third positioning portion 32F that determines a predetermined third relative phase position of the transmission 52 with respect to the crankshaft 32 in the circumferential direction about the rotational center axis JC. The third coupling portion 32E is spaced apart from the first coupling portions 32A and the second coupling portion 52A in the axial direction of the crankshaft 32. Preferably, the third coupling portion 32E is provided on a second end of the transmission 52 in a direction extending along the rotational center axis JC.

Figure 9:
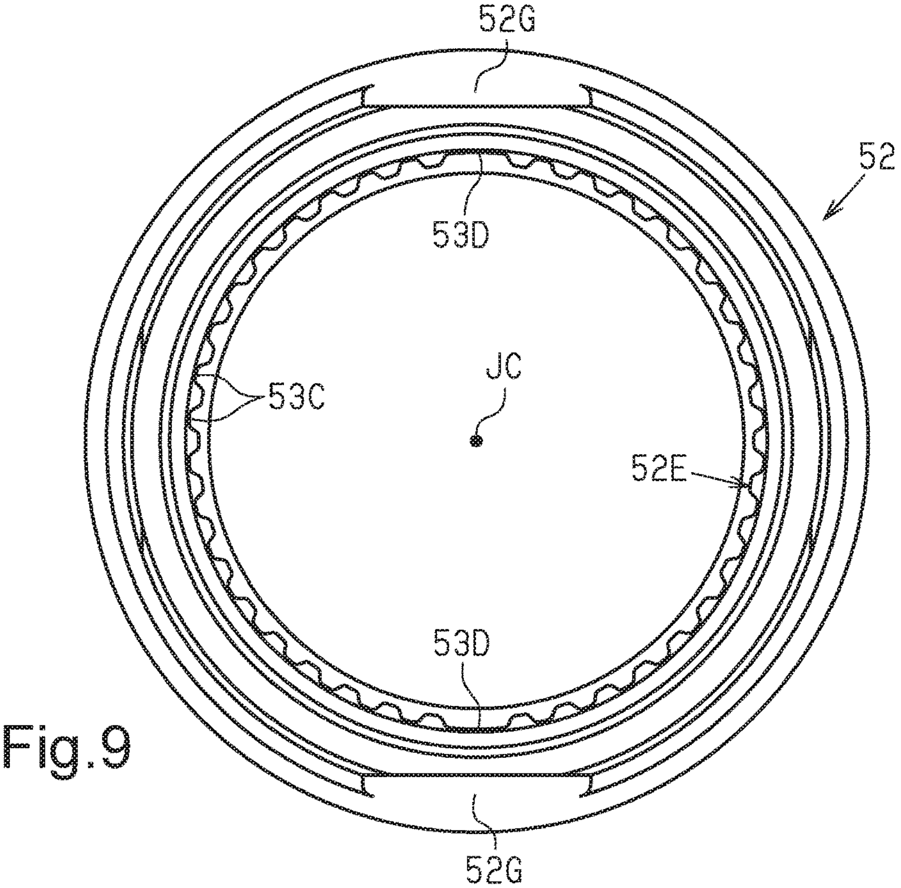
FIG. 9 is an axial view of the transmission as viewed in a direction extending along the rotational center axis.

The transmission 52 includes at least one of a recess and a projection, and the third positioning portion 32F includes at least the other one of the recess and the projection engaged with the at least one of the recess and the projection. The transmission 52 includes a serration 52E as one example of the at least one of the recess and the projection. The serration 52E is provided on an inner circumferential portion of the second end of the transmission 52. In the present embodiment, the serration 52E includes a plurality of recesses extending along the rotational center axis JC. Preferably, the recesses of the serration 52E are arranged on the entire circumference in the circumferential direction about the rotational center axis JC. As shown in FIG. 9, the recesses of the serration 52E include a plurality of first recesses 53C and a pair of second recesses 53D. The first recesses 53C are arranged at a predetermined pitch in the circumferential direction about the rotational center axis JC. The second recesses 53D are wider than the first recesses 53C about the rotational center axis JC. In one example, the second recesses 53D are located at positions separated by 180° in the circumferential direction about the rotational center axis JC. The width of each second recess 53D is two times greater than the pitch of the first recesses 53C. In the present embodiment, the outer circumferential surface of the transmission 52 includes positioning marks 52G corresponding to locations including the two second recesses 53D in the circumferential direction about the rotational center axis JC. The positioning marks 52G include flat portions of the outer circumferential surface of the transmission 52. In a case in which a person inserts the transmission 52 into the crankshaft 32, the positioning marks 52G allow the person to recognize an approximate position of the second recesses 53D in the transmission 52 in the circumferential direction of the rotational center axis JC.

Figure 10:
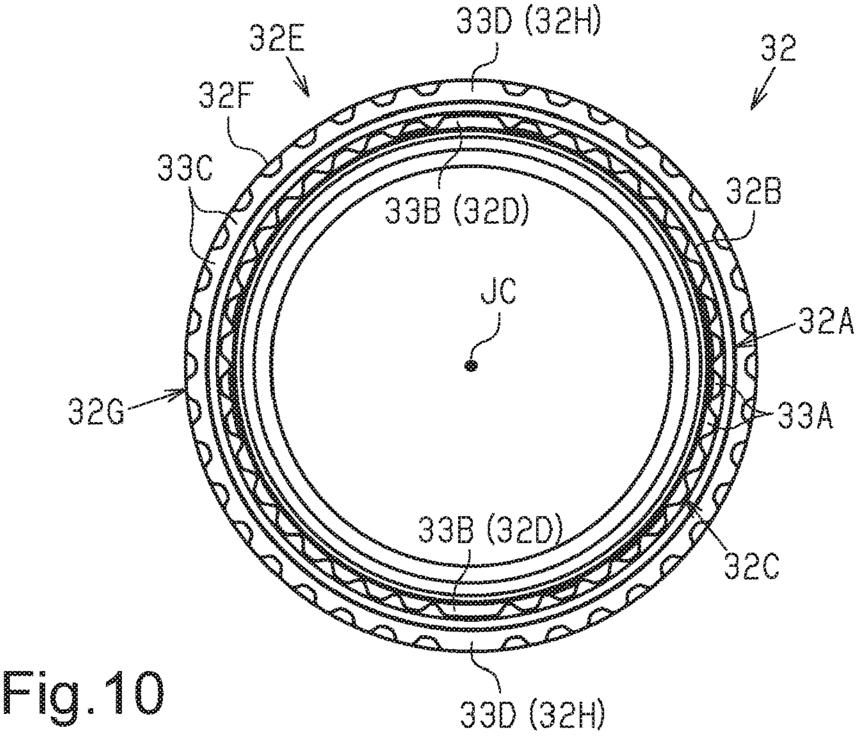
FIG. 10 is an axial view of the crankshaft as viewed in a direction extending along the rotational center axis.

As shown in FIG. 8, the third positioning portion 32F includes a serration 32G engaged with the serration 52E of the transmission 52 as one example of at least the other one of the recess and the projection engaged with the at least one of the recess and the projection. In the present embodiment, the serration 32G include a plurality of projections extending along the rotational center axis JC. Preferably, the projections of the serration 32G are arranged on the entire circumference in the circumferential direction about the rotational center axis JC. The projections of the serration 32G include first projections 33C arranged at a predetermined pitch in the circumferential direction about the rotational center axis JC and second projections 33D, which are wider than the first projections 33C about the rotational center axis JC. In one example, the pitch of the first projections 33C of the serration 32G is equal to the pitch of the first recesses 53C of the serration 52E. The third positioning portion 32F includes third marks 32H. The third marks 32H include the second projections 33D. In one example, as shown in FIG. 10, the second projections 33D are provided at two locations separated by 180° in the circumferential direction about the rotational center axis JC. In the present embodiment, the two second projections 33D and the two second projections 33B are located at the same position in the circumferential direction about the rotational center axis JC. In one example, each second projection 33D includes a projection corresponding to two pitches of the first projections 33C. The pitch of the first projections 33C of the serration 32G is equal to the pitch of the first projections 33A on the serration 32C of the first positioning portion 32B.

In a state in which the serration 32G of the crankshaft 32 engages with the serration 52E of the transmission 52, the two second projections 33B, which are included in the third marks 32H of the third positioning portion 32F, engage with the two second recesses 53D. In a case in which the transmission 52 is coupled to the crankshaft 32 so that one of the two second projections 33D of the third marks 32H engages with one of the two second recesses 53D, and the other one of the two second projections 33D engages with the other one of the two second recesses 53D, the position of the transmission 52 with respect to the crankshaft 32 is set to the third relative phase position in the circumferential direction about the rotational center axis JC. Also, in a case in which the transmission 52 is coupled to the crankshaft 32 so that the other one of the two second projections 33D of the third marks 32H engages with the one of the two second recesses 53D and the one of the two second projections 33D engages with the other one of the two second recesses 53D, the position of the transmission 52 with respect to the crankshaft 32 is set to the third relative phase position in the circumferential direction about the rotational center axis JC.

The widths of the first recesses 53C and the widths of the second recesses 53D and the positions of the second recesses 53D in the circumferential direction about the rotational center axis JC can be changed in any manner. The second recesses 53D only need to be configured to be distinguished from the first recesses 53C by a person who couples the crankshaft 32 to the transmission 52. One of the second recesses 53D can be omitted, and one of the second projections 33D can be omitted from the crankshaft 32. The predetermined pitch of the first projections 33C of the serration 32G and the predetermined pitch of the first recesses 53C of the serration 52E can be changed in any manner.

One example of a structure that couples the crankshaft 32 to the crank arms 34 will now be described with reference to FIGS. 11 and 12. Each of the first coupling portions 32A of the crankshaft 32 includes a hole 32I. In one example, the hole 32I is located at the same position as one of the two second projections 33B, which are included in the first marks 32D of the first positioning portion 32B, in the circumferential direction about the rotational center axis JC. The crankshaft 32 is inserted into the through hole 34B of the crank arm 34 so that the hole 321 and the slit 34C of the crank arm 34 are located at the same position in the circumferential direction about the rotational center axis JC. The serration 32C of the crankshaft 32 engages with the serration 34E of the crank arm 34. The other one of the two second projections 33B, which are included in the first marks 32D of the crankshaft 32, engages with the second recess 34F of the crank arm 34. As a result, the crank arm 34 is located at the first relative phase position with respect to the crankshaft 32. In a case in which the sprocket 14 includes the shift regions 40 located in at least positions separated by 180° in the circumferential direction about the rotational center axis JC, the holes 32I can be respectively provided at the two second projections 33B of the first marks 32D.

The crank 30 includes a restriction member 38 that restricts relative movement of the crankshaft 32 and the crank arms 34 in a direction extending along the rotational center axis JC. The restriction member 38 includes a body 38A, a first engagement portion 38B, a second engagement portion 38C, and a restriction 38D. In one example, the body 38A and the restriction 38D are separately formed, and the restriction 38D is fixed to the body 38A. The body 38A is plate-shaped. The first engagement portion 38B includes a through hole provided at the body 38A. The second engagement portion 38C includes a through groove extending through the body 38A in the thickness-wise direction and open at one side in a first direction orthogonal to the thickness-wise direction of the body 38A. As shown in FIG. 11, the first engagement portion 38B and the second engagement portion 38C are adjacent to each other in a direction parallel to the rotational center axis JC. The restriction 38D projects from a peripheral surface of the body 38A. The restriction 38D is arranged between the first engagement portion 38B and the second engagement portion 38C in a direction parallel to the rotational center axis JC. The restriction member 38 can have a structure in which the body 38A and the restriction 38D are integrally formed.

Figure 11:
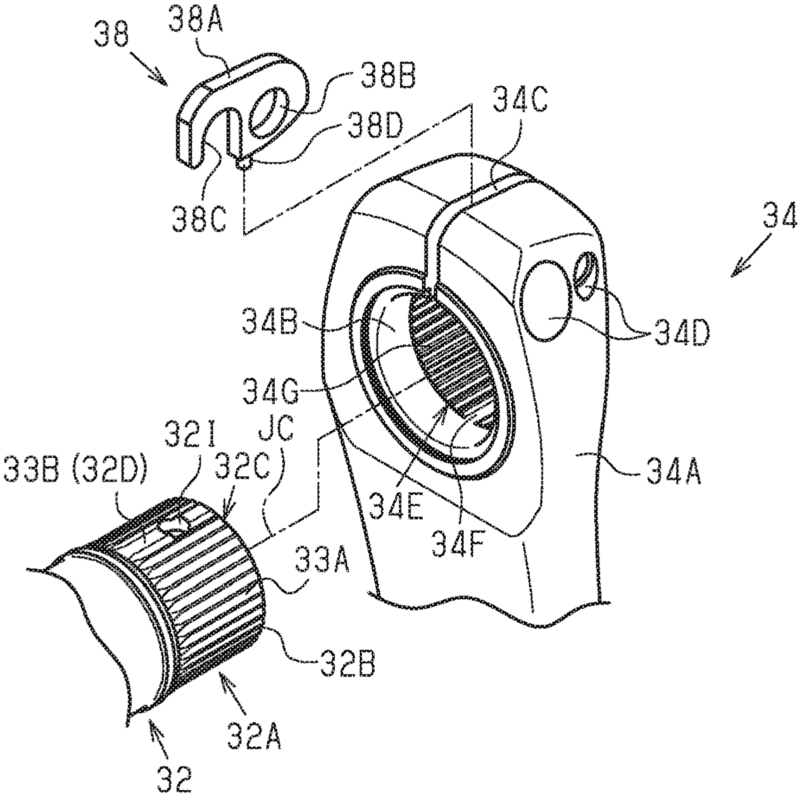
FIG. 11 is a perspective view showing a coupling structure of the crankshaft and one of the crank arms.
Figure 12A:
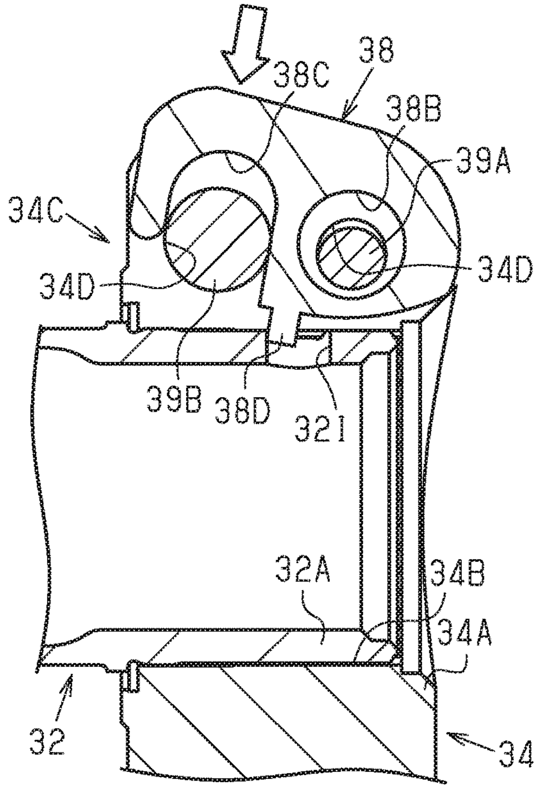
FIG. 12A is a cross-sectional view of the crankshaft and the crank arm in a state in which a restriction member does not restrict the crankshaft.

As shown in FIGS. 11 and 12A, the restriction member 38 is inserted into the slit 34C of the crank arm 34. FIG. 12A shows a state in which the crank arm 34 is coupled to the crankshaft 32. As shown in FIG. 12A, movement of the restriction member 38 is restricted by bolts 39A and 39B that are respectively inserted into the two holes 34D of the crank arm 34. The bolt inserted into one of the two holes 34D is inserted into the through hole of the first engagement portion 38B to prevent separation of the restriction member 38 from the crank arm 34. The restriction member 38 shown in FIG. 12A is configured to be pivotal about the bolt 39A inserted into the first engagement portion 38B.

Figure 12B:
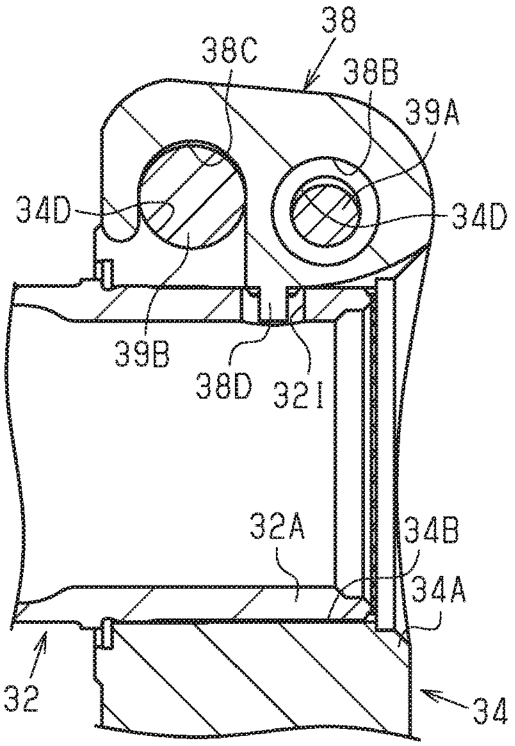
FIG. 12B is a cross-sectional view of the crankshaft and the crank arm in a state in which the restriction member restricts the crankshaft.

As shown in FIG. 12B, the restriction member 38 pivots so that the second engagement portion 38C engages with the bolt 39B, which is inserted into the other one of the two holes 34D, and the restriction 38D is inserted into the hole 321 of the crankshaft 32. This restricts relative movement of the crankshaft 32 and the crank arm 34 in a direction extending along the rotational center axis JC. The bolts 39A and 39B inserted in the two holes 34D are tightened so that the slit 34C narrows. This fastens the crank arm 34 to the crankshaft 32.

One example of an internal structure of the component 50 will now be described with reference to FIG. 13. The component 50 further includes a housing 54 rotatably supporting the crankshaft 32. The component 50 further includes a motor 56 assisting propulsion of the human-powered vehicle B. The motor 56 is provided on the housing 54 and configured to drive the transmission 52. In the present embodiment, the component 50 is configured to be a drive unit.

The component 50 further includes a transmission mechanism 58, a first bearing 62A, a second bearing 62B, and a drive circuit 64. The transmission mechanism 58 transmits a rotation force of the motor 56 to the transmission 52. The first bearing 62A and the second bearing 62B rotatably support the crankshaft 32 and the transmission 52 relative to the housing 54, respectively. The drive circuit 64 is configured to control driving of the motor 56.

The housing 54 accommodates a portion of the crankshaft 32, the motor 56, the drive circuit 64, a portion of the transmission 52, and the transmission mechanism 58. The drive circuit 64 can be provided outside the housing 54.

Portions of the crankshaft 32 project from opposite sides of the housing 54 in a direction parallel to the rotational center axis JC. A portion of the transmission 52 provided on the outer circumference of the crankshaft 32 projects from one side of the housing 54 in a direction parallel to the rotational center axis JC. The sprocket 14 can be removably coupled to the transmission 52.

Figure 13:
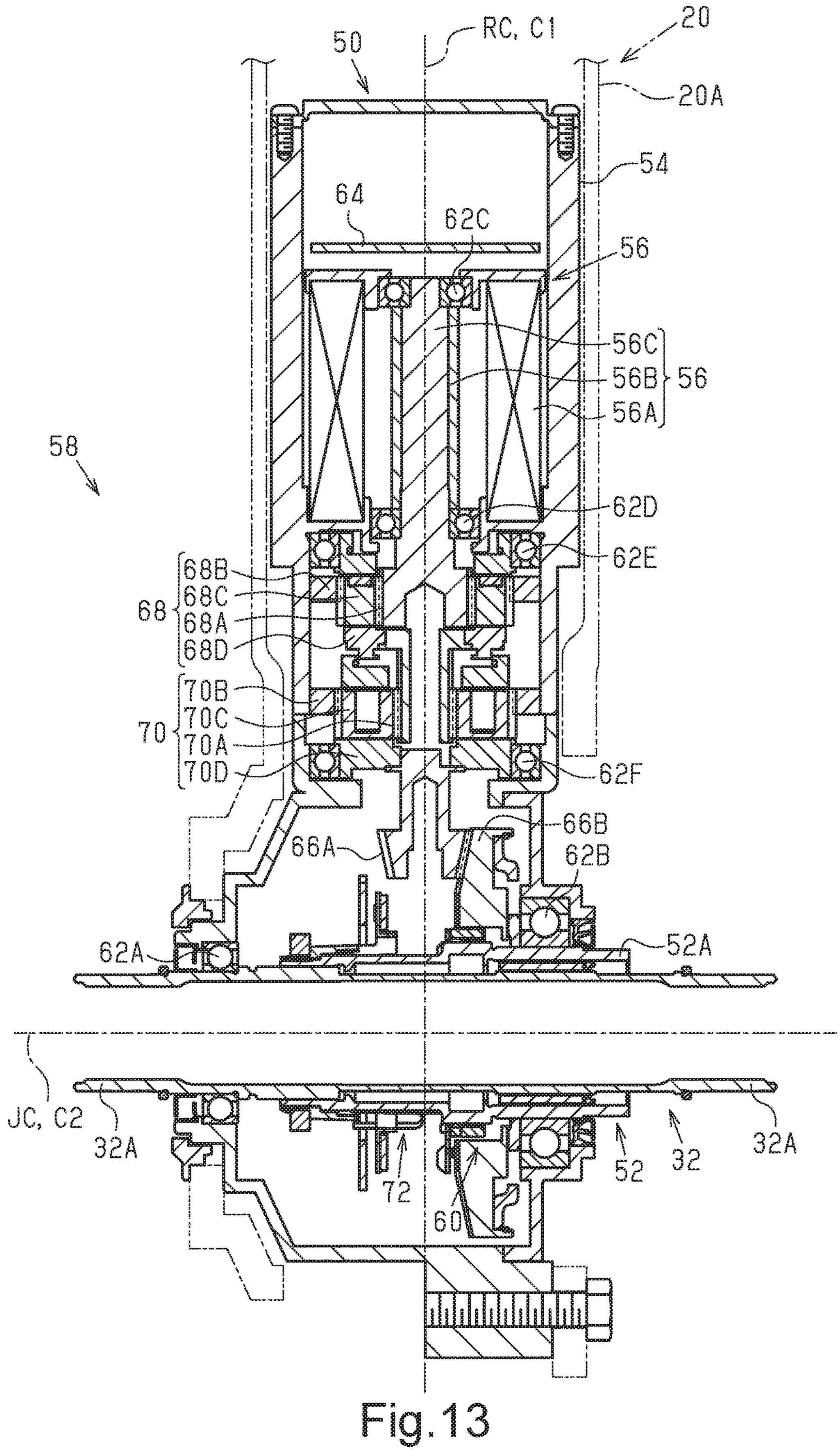
FIG. 13 is a cross-sectional view of the human-powered vehicle component in the vicinity of the crankshaft.

As shown in FIG. 13, the first bearing 62A rotatably supports the crankshaft 32 relative to the housing 54. The second bearing 62B rotatably supports the transmission 52 relative to the housing 54.

One example of the motor 56 is a brushless motor. The motor 56 includes a stator 56A, a rotor 56B, an output shaft 56C, a third bearing 62C, and a fourth bearing 62D. The stator 56A is fixed to an inner circumferential portion of the housing 54. The rotor 56B is arranged at an inner circumferential portion of the stator 56A. The output shaft 56C is fixed to the rotor 56B and rotates integrally with the rotor 56B. The third bearing 62C and the fourth bearing 62D rotatably support the rotor 56B and the output shaft 56C relative to the housing 54.

The motor 56 includes a rotational center axis RC parallel to a direction differing from the direction parallel to the rotational center axis JC of the crankshaft 32. The rotational center axis RC extends in a direction intersecting with the direction extending along the rotational center axis JC. In one example, the rotational center axis RC of the motor 56 and the rotational center axis JC of the crankshaft 32 are coplanar with each other. In one example, the rotational center axis RC of the motor 56 is orthogonal to the rotational center axis JC of the crankshaft 32. The drive circuit 64 and the transmission mechanism 58 are located at opposite sides of the motor 56 in a direction extending along the rotational center axis RC.

The transmission mechanism 58 is connected to the motor 56. The transmission mechanism 58 includes a first rotary body 66A, a second rotary body 66B, a one-way clutch 60, a fifth bearing 62E, and a sixth bearing 62F. The first rotary body 66A rotates about a first axis C1. The second rotary body 66B is in contact with the first rotary body 66A and rotates about a second axis C2, which intersects with the first axis C1. The first axis C1 is parallel to the rotational center axis RC of the motor 56. The second axis C2 is parallel to the rotational center axis JC of the crankshaft 32. In FIG. 13, the first axis C1 is aligned with the rotational center axis RC of the motor 56. The second axis C2 is aligned with the rotational center axis JC of the crankshaft 32. The transmission mechanism 58 further includes a first transmission mechanism 68 and a second transmission mechanism 70. The first transmission mechanism 68 and the second transmission mechanism 70 are arranged next to each other in a direction extending along the rotational center axis RC. The first transmission mechanism 68 is arranged between the motor 56 and the second transmission mechanism 70 in the direction extending along the rotational center axis RC.

The first transmission mechanism 68 includes a planetary gear mechanism. The first transmission mechanism 68 includes a first sun gear 68A, a first ring gear 68B, a plurality of first planetary gears 68C, and a first carrier 68D. The first sun gear 68A is provided on the outer circumferential portion of the output shaft 56C of the motor 56. The first sun gear 68A can be formed integrally with the output shaft 56C or can be formed separately from the output shaft 56C and coupled to the output shaft 56C. The first ring gear 68B is provided on the inner circumferential portion of the housing 54. The first ring gear 68B can be formed integrally with the housing 54 or can be formed separately from the housing 54. The first planetary gears 68C are arranged between the first sun gear 68A and the first ring gear 68B. The first carrier 68D supports the first planetary gears 68C and integrally rotates the first planetary gears 68C around the first sun gear 68A. The fifth bearing 62E is provided on the inner circumferential portion of the housing 54 to rotatably support the first carrier 68D relative to the housing 54.

The second transmission mechanism 70 includes a planetary gear mechanism. The second transmission mechanism 70 includes a second sun gear 70A, a second ring gear 70B, a plurality of second planetary gears 70C, and a second carrier 70D. The second sun gear 70A is connected to the first carrier 68D and rotated integrally with the first carrier 68D. The second ring gear 70B is provided on the inner circumferential portion of the housing 54. The second ring gear 70B can be formed integrally with the housing 54 and can be formed separately from the housing 54. The second planetary gears 70C are arranged between the second sun gear 70A and the second ring gear 70B. The second carrier 70D supports the second planetary gears 70C and integrally rotates the second planetary gears 70C about the second sun gear 70A. The sixth bearing 62F is provided on the inner circumferential portion of the housing 54 and rotatably supports the second carrier 70D relative to the housing 54.

Torque of the motor 56 is transmitted to the first rotary body 66A. The second rotary body 66B engages with the first rotary body 66A and transmits the torque to the transmission 52. Each of the first rotary body 66A and the second rotary body 66B includes a bevel gear. The first rotary body 66A is connected to the second carrier 70D and rotated integrally with the second carrier 70D. The first rotary body 66A has fewer teeth than the second rotary body 66B. The second rotary body 66B is provided on the outer circumferential portion of the transmission 52. The second rotary body 66B converts rotation of the first rotary body 66A about the first axis C1 into rotation of the second rotary body 66B about the second axis C2 and outputs the rotation to the transmission 52.

Rotation of the motor 56 is reduced in speed in three steps by the first transmission mechanism 68, the second transmission mechanism 70, the first rotary body 66A, and the second rotary body 66B and transmitted to the transmission 52. The transmission mechanism 58 can reduce the speed of rotation of the motor 56 in two steps or less or four steps or more and transmit the rotation to the transmission 52. The number of speed reduction steps of the transmission mechanism 58 and the reduction ratio can be changed. Also, the configuration of the transmission mechanism 58 can be changed in accordance with a desired reduction ratio.

The one-way clutch 60 is provided on a power transmission path between the motor 56 and the transmission 52. Preferably, the one-way clutch 60 is provided between the inner circumferential portion of the second rotary body 66B and the outer circumferential portion of the transmission 52. The crankshaft 32, the transmission 52, and the second rotary body 66B are coaxially provided. In a case in which the rotation speed of the second rotary body 66B is greater than or equal to the rotation speed of the transmission 52 in a first rotation direction, the one-way clutch 60 transmits rotation of the second rotary body 66B to the transmission 52. In a case in which the rotation speed of the second rotary body 66B is less than the rotation speed of the transmission 52 in the first rotation direction, the one-way clutch 60 does not transmit rotation of the second rotary body 66B to the transmission 52. The one-way clutch 60 can be configured by a roller clutch, a ratchet clutch, or a sprag clutch.

The component 50 further includes a detector 72. The detector 72 is provided on the housing 54. The term "detector" as used herein refers to a hardware device or instrument designed to detect the presence of a particular object or substance and to emit a signal in response. The term "detector" as used herein do not include a human. The detector 72 detects human driving force transmitted from the crankshaft 32. The detector 72 is provided, for example, on the transmission 52 or in the vicinity of the transmission 52. The detector 72 includes, for example, a strain sensor or magnetostriction sensor. The strain sensor includes a strain gauge. In a case in which the detector 72 includes a strain sensor, the strain sensor is provided, for example, on the outer circumferential portion of the transmission 52. The detector 72 can include a wireless or wired communicator. The detector 72 can include a rotation sensor that detects a rotation state of the crankshaft 32. The rotation state of the crankshaft 32 includes at least one of a crank rotational speed and a rotation angle.

Figure 14:
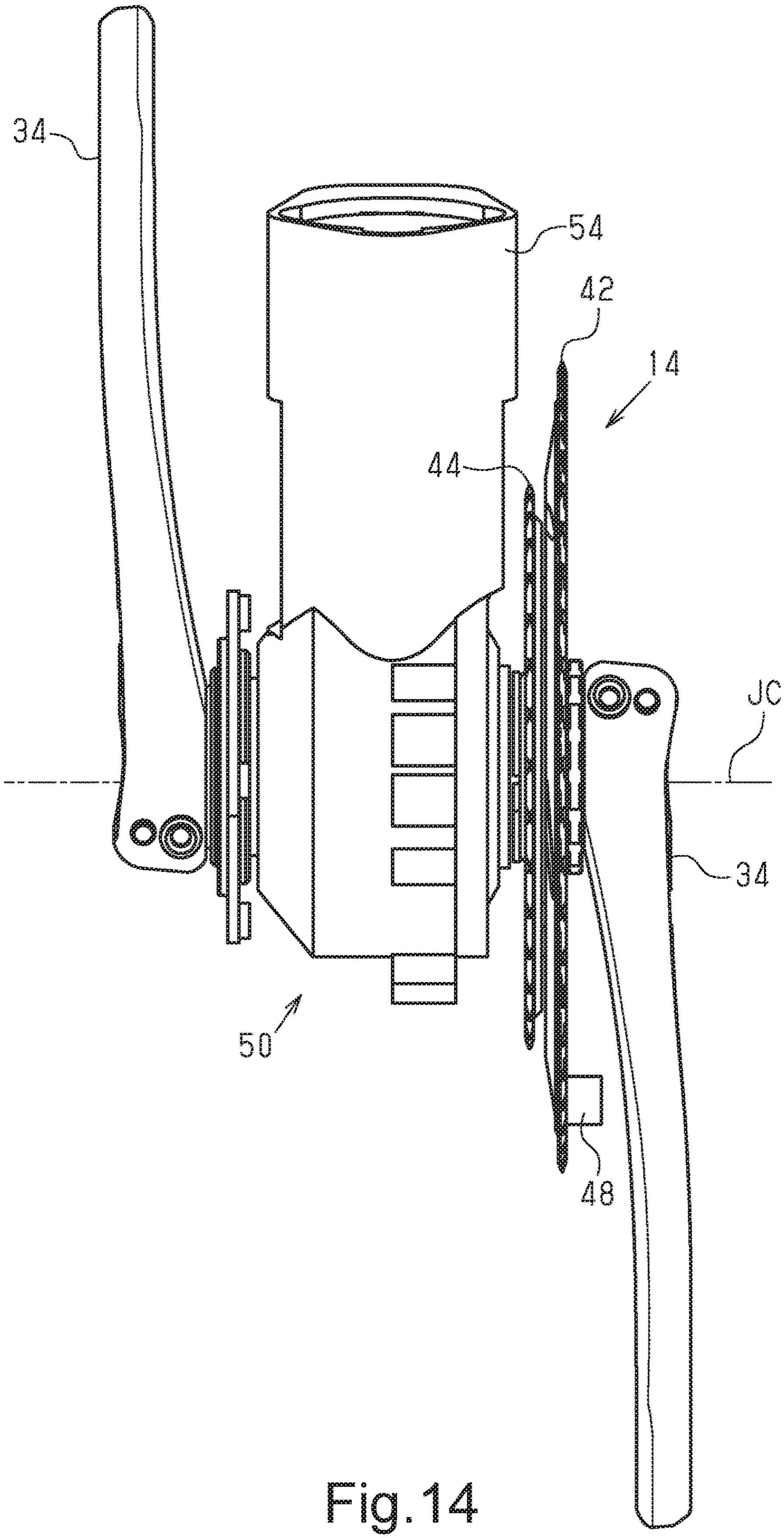
FIG. 14 is a front elevational view of the human-powered vehicle component, the crank arms, and the sprockets.

A structure that limits entrapment of the chain 16A in a gap between the crank arm 34 and the sprocket 14 will now be described with reference to FIGS. 14 and 15. As shown in FIG. 14, a projection 48 is provided on a surface of the first sprocket 42 located toward the crank arm 34. In one example, the projection 48 is cylindrical and extends toward the crank arm 34 in a direction parallel to the rotational center axis JC.

Figure 15:
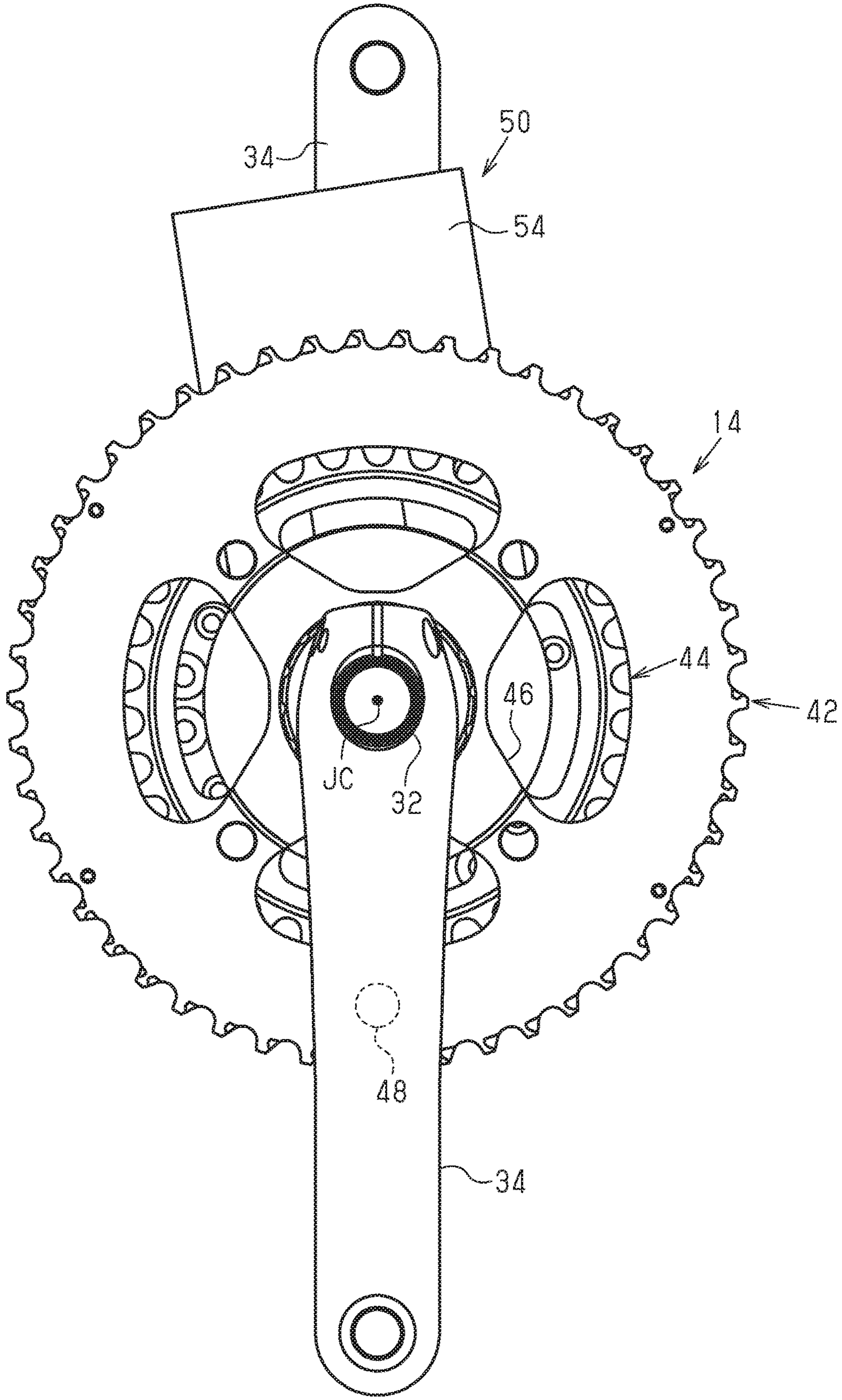
FIG. 15 is a side elevational view of the human-powered vehicle component, the crank arms, and the sprockets.

As shown in FIG. 15, the projection 48 is arranged to overlap with the crank arm 34 as viewed in a direction parallel to the rotational center axis JC. As shown in FIG. 14, the gap between the projection 48 and the crank arm 34 is set to a size that does not allow insertion of the chain 16A in the direction parallel to the rotational center axis JC. Even in a case in which the chain 16A separates from the teeth 42A of the first sprocket 42, the projection 48 and the crank arm 34 support the chain 16A. Thus, in a case in which the chain 16A separates from the first sprocket 42, entrapment of the chain 16A in the gap between the crank arms 34 and the sprocket 14 is limited.

Modifications

The description related to the embodiment exemplifies, without any intention to limit, applicable forms of a human-powered vehicle component according to the present disclosure. The human-powered vehicle component according to the present disclosure can be applicable to, for example, modifications of the embodiment described below and a combination of at least two of the modifications that do not contradict each other. In the following modifications, the same reference characters are given to those elements that are the same as the corresponding elements of the embodiment. Such elements will not be described in detail.

In the embodiment, the battery 24 and the component 50 are configured to be accommodated in the frame 20. However, at least one of the battery 24 and the component 50 can be coupled to an outer side of the frame 20.

Figure 16:
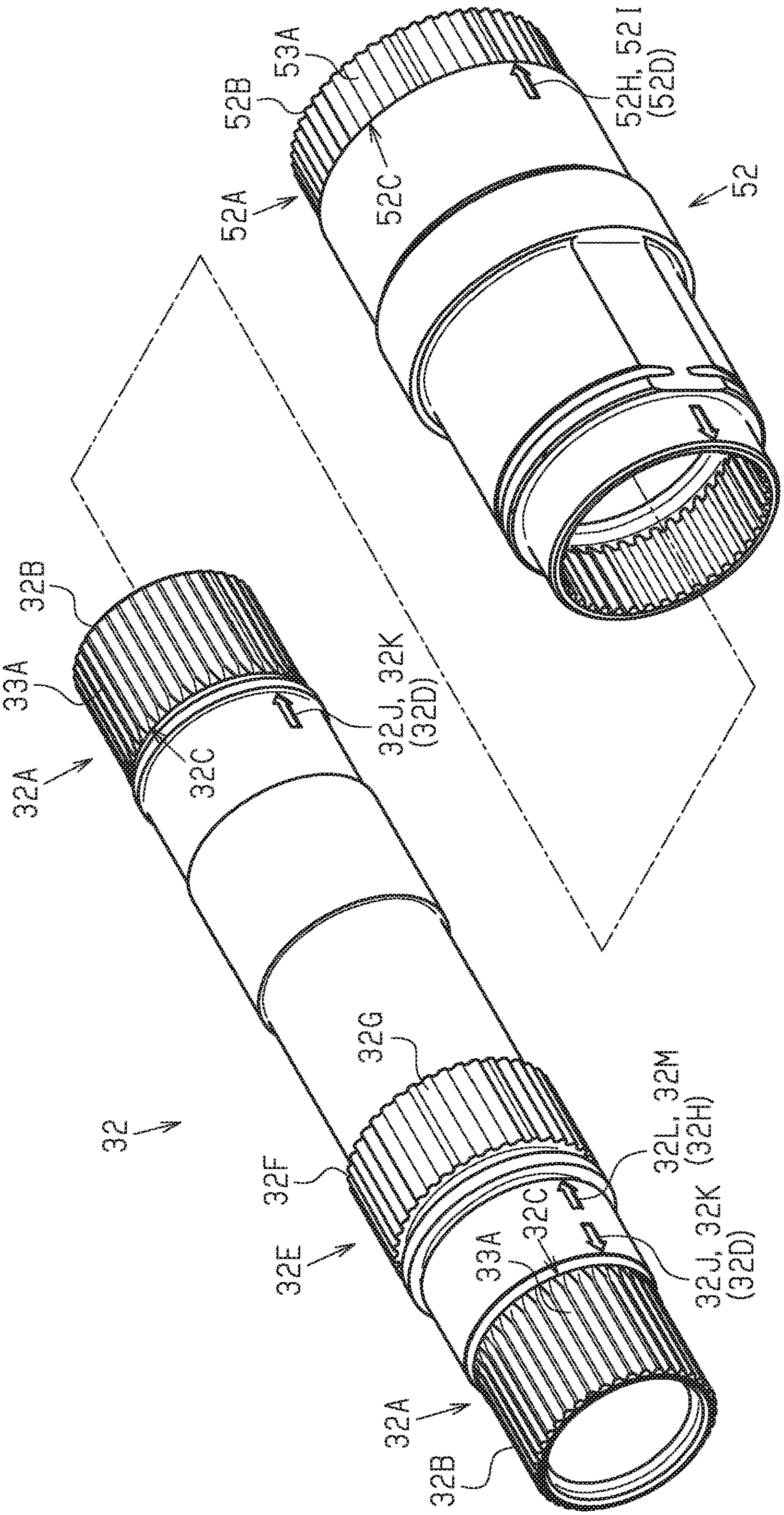
FIG. 16 is an exploded perspective view showing a modification of a crankshaft and a transmission.

In the embodiment and its modifications, the first to third marks 32D, 32H, and 52D are not limited to the wide projections provided on the serration 32C, 32G, and 52C and can be a predetermined mark that can be recognized by a person. In one example, as shown in FIG. 16, the first marks 32D are configured by arrows provided on the first coupling portions 32A of the crankshaft 32. In one example, the second marks 52D are configured by arrows provided on the second coupling portion 52A of the transmission 52. In one example, the third marks 32H are configured by arrows provided on the third coupling portion 32E of the crankshaft 32.

In one example, the first marks 32D include at least one of a first imprint 32J and a first print 32K. The second marks 52D include at least one of a second imprint 52H and a second print 521. The third marks 32H include at least one of a third imprint 32L and a third print 32M.

Figure 17A:
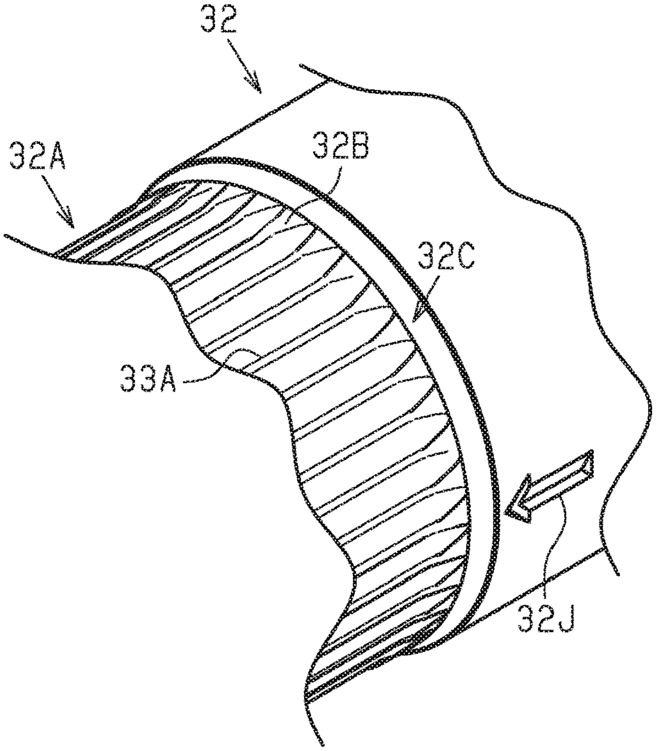
FIG. 17A is a perspective view showing one example of a first imprint.
Figure 17B:
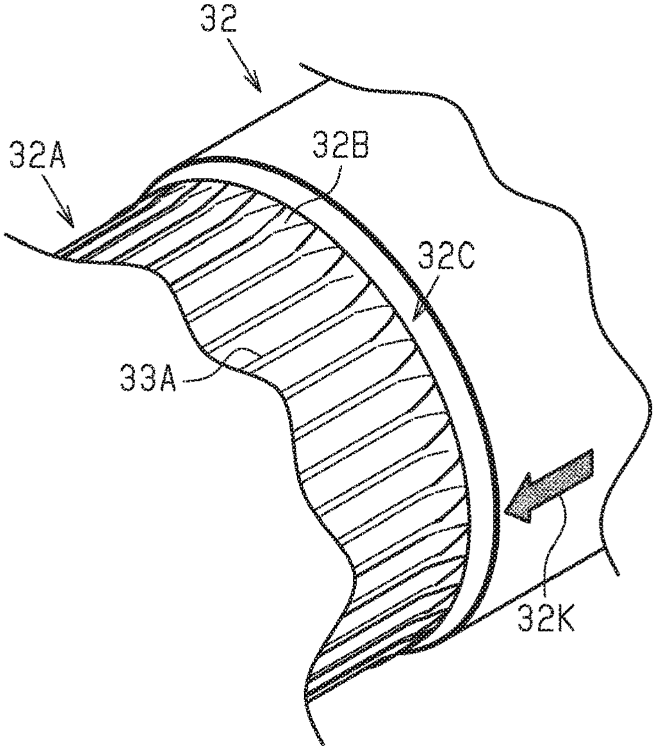
FIG. 17B is a perspective view showing one example of a first print.

In one example, as shown in FIG. 17A, the first imprint 32J is formed by imprinting a predetermined mark on the first coupling portion 32A. As shown in FIG. 17B, the first print 32K is formed by printing a predetermined mark on the first coupling portions 32A. In the same manner, the second imprint 52H and the second print 521 of the second marks 52D and the third imprint 32L and the third print 32M of the third marks 32H can be an imprint formed by imprinting a predetermined mark as shown in FIG. 17A and a print formed by printing a predetermined mark shown FIG. 17B. The print can be performed by, for example, an inkjet printer or a screen printer.

The first to third marks 32D, 32H, and 52D are not limited to imprints and prints and can be formed by, for example, applying a sticker or writing with a pen. The first to third marks 32D, 32H, and 52D only need to be marks that are provided on the crankshaft 32 and the transmission 52 and recognizable by a person.

Figure 18:
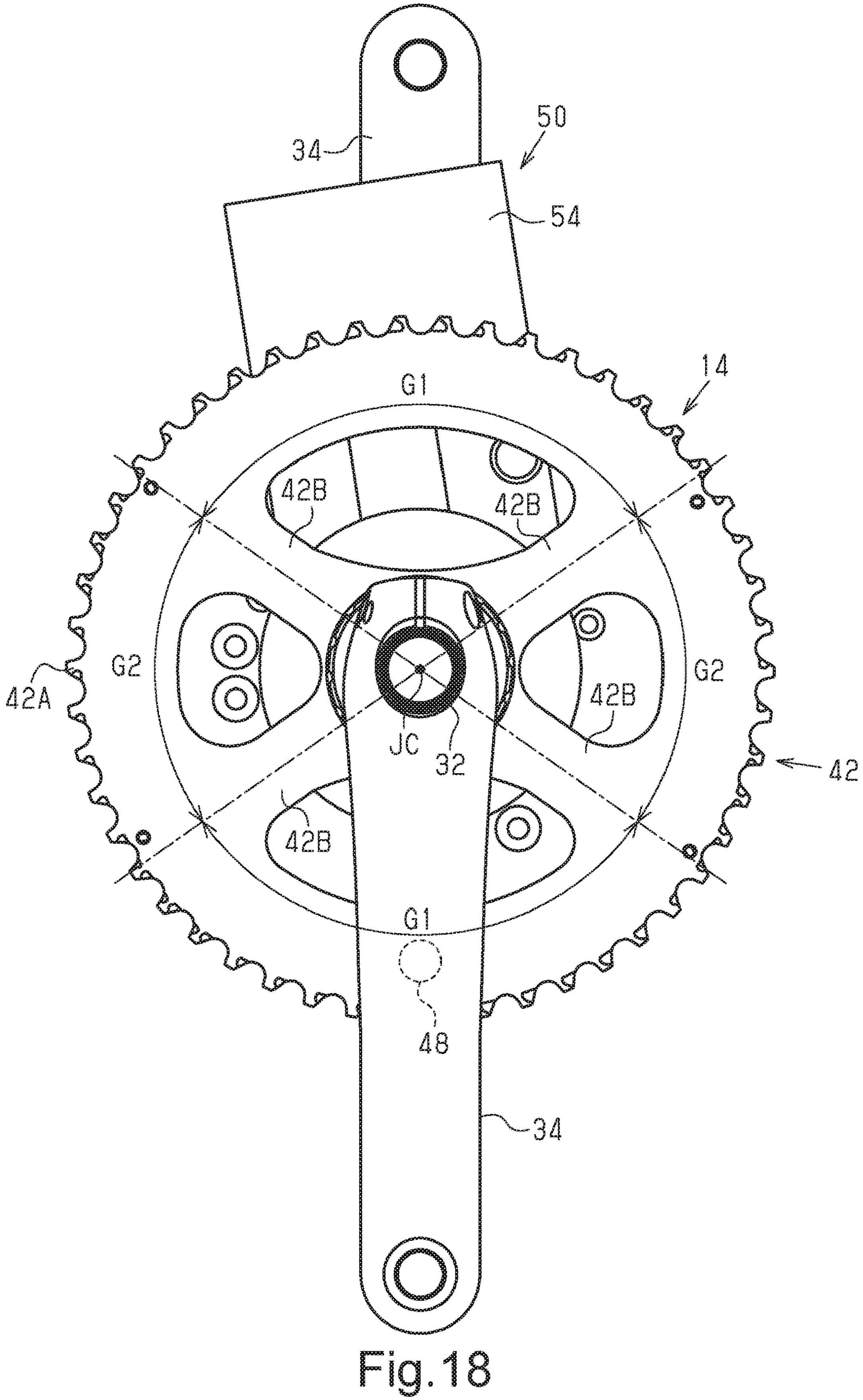
FIG. 18 is a side elevational view of a modification of a human-powered vehicle component, crank arms, and a sprocket.

In the embodiment and its modifications, the sprocket 14 can include only one sprocket. In one example, the sprocket 14 has a structure in which the first sprocket 42 is formed integrally with the adapter 46. As shown in FIG. 18, the sprocket 14 includes, for example, four attaching portions 42B. The four attaching portions 42B are arranged at non-equal intervals in the circumferential direction about the rotational center axis JC. The four attaching portions 42B are arranged so that intervals of adjacent ones of the attaching portions 42B are a first interval G1 and a second interval G2, which is smaller than the first interval G1, in the circumferential direction about the rotational center axis JC. In the present embodiment, the interval of the attaching portions 42B refers to an interval of center lines of the attaching portions 42B extending through the center of the rotational center axis JC and the middle of the attaching portions 42B in the circumferential direction about the rotational center axis JC. In a case in which the four attaching portions 42B includes a first attaching portion, a second attaching portion, a third attaching portion, and a fourth attaching portion arranged in the circumferential direction of the rotational center axis JC, the interval of the first attaching portion and the second attaching portion and the interval of the third attaching portion and the fourth attaching portion correspond to the first intervals G1, and the interval of the second attaching portion and the third attaching portion and the interval of the first attaching portion and the fourth attaching portion correspond to the second intervals G2. The crank arms 34 and the sprocket 14 are coupled to the crankshaft 32 so that the crank arms 34 are arranged in the first intervals G1 as viewed in a direction in which the rotational center axis JC extends.

In the embodiment and its modifications, the crankshaft 32 can be integrated with the transmission 52. In this case, the third coupling portion 32E, the third positioning portion 32F, and the serration 32G are omitted from the crankshaft 32, and the serration 52E is omitted from the transmission 52. Thus, the transmission 52 can be directly formed on an outer surface of the crankshaft 32.

In the embodiment and its modifications, the coupling portion 34A of the crank arm 34 includes the serration 34E as one example of the at least one of the recess and the projection of the crank arm 34 but can include a recess other than the serration 34E. The first positioning portion 32B of the crankshaft 32 includes the serration 32C as one example of the at least the other one of the recess and the projection but can include a projection other than the serration 32C. The at least one of the recess and the projection of the crank arm 34 and the at least the other one of the recess and the projection of the first positioning portion 32B of the crankshaft 32 only need to have a recess-projection engagement that restricts relative rotation of the crank arm 34 and the crankshaft 32 about the rotational center axis JC.

In the embodiment and its modifications, the coupling portion 46A of the adapter 46 of the sprocket 14 includes the serration 46E as one example of the at least one of the recess and the projection of the sprocket 14 but can include a recess other than the serration 46E. The second positioning portion 52B of the transmission 52 includes the serration 52C as one example of the at least the other one of the recess and the projection but can include a projection other than the serration 52C. The at least one of the recess and the projection of the sprocket 14 and the at least the other one of the recess and the projection of the second positioning portion 52B of the transmission 52 only need to have a recess-projection engagement that restricts relative rotation of the sprocket 14 and the transmission 52 about the rotational center axis JC.

In the embodiment and its modifications, the transmission 52 includes the serration 52E as one example of the at least one of the recess and the projection but can include a recess other than the serration 52E. The third positioning portion 32F of the crankshaft 32 includes the serration 32G as one example of the at least the other one of the recess and the projection but can include a projection other than the serration 32G. The at least one of the recess and the projection of the transmission 52 and the at least the other one of the recess and the projection of the third positioning portion 32F of the crankshaft 32 only need to have a recess-projection engagement that restricts relative rotation of the transmission 52 and the crankshaft 32 about the rotational center axis JC.

In the embodiment and its modifications, each serration can be changed to a spline.

In the embodiment and its modifications, the configuration of the motor 56 and the transmission mechanism 58 of the component 50 is not limited to that shown in FIG. 13. For example, the motor 56 can be provided at the housing so that the rotation shaft is parallel to the crankshaft. For example, the transmission mechanism 58 can be configured by a spur gear.

In the embodiment and its modifications, at least one of the motor, a reduction unit, and the drive circuit can be omitted from the component 50. In the embodiment and its modifications, the housing 54 can be formed integrally with the frame 20. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A human-powered vehicle component comprising:

a crankshaft including a rotational center axis and a first coupling portion configured to be coupled to a crank arm; and a transmission provided on the crankshaft and including a second coupling portion configured to be coupled to a sprocket, the transmission being a hollow member that receives the crankshaft therethrough, the transmission being a one-piece member, the first coupling portion including a first positioning portion that determines a first predetermined relative phase position of the crank arm with respect to the crankshaft in a circumferential direction about the rotational center axis, and the second coupling portion including a second positioning portion that determines a second predetermined relative phase position of the sprocket with respect to the transmission in the circumferential direction about the rotational center axis, the second coupling portion being provided at a first end of the transmission along an axial direction of the crankshaft, the first coupling portion being positioned adjacent to the second coupling portion when the crankshaft is received by the transmission, the crankshaft further including a third coupling portion configured to be coupled to the transmission, the third coupling portion including a third positioning portion that determines a third predetermined relative phase position of the transmission with respect to the crankshaft in the circumferential direction about the rotational center axis, the first positioning portion including a plurality of first projections and at least one first positioning recess and/or at least one first positioning projection configured and arranged to engage with at least one projection and/or at least one recess, respectively, of the crank arm only when the crank arm is arranged at the first predetermined relative phase position with respect to the crankshaft, each of the at least one first positioning recess and/or at least one first positioning projection having a larger width in a circumferential direction of the crankshaft than each of the plurality of first projections, and the second positioning portion including a plurality of second projections and at least one second positioning recess and/or at least one second positioning projection configured and arranged to engage with at least one projection and/or at least one recess, respectively, of the sprocket only when the sprocket is arranged at the second predetermined relative phase position with respect to the transmission, each of the at least one second positioning recess and/or at least one second positioning projection having a larger width in the circumferential direction of the crankshaft than each of the plurality of second projections, the third positioning portion including at least one third recess and/or at least one third projection, the transmission including at least one fourth projection and/or at least one fourth recess, the at least one third recess and/or the at least one third projection being configured and arranged to engage with the at least one fourth projection and/or the at least one fourth recess, respectively, of the transmission only when the transmission is arranged at the third predetermined relative phase position with respect to the crankshaft, and the crankshaft including a hole formed in the first coupling portion, the hole extending in a radial direction of the crankshaft and positioned on one of the at least one first positioning recess and/or at least one first positioning projection of the first positioning portion, the hole being configured to receive a restriction protruding radially inward from the crank arm.

2. The human-powered vehicle component according to claim 1, wherein the first positioning portion includes a first mark.

3. The human-powered vehicle component according to claim 2, wherein the first mark includes at least one of a first imprint and a first print.

4. The human-powered vehicle component according to claim 1, wherein the second positioning portion includes a second mark.

5. The human-powered vehicle component according to claim 4, wherein the second mark including at least one of a second imprint and a second print.

6. The human-powered vehicle component according to claim 1, wherein the first coupling portion and the second coupling portion are spaced apart in an axial direction of the crankshaft.

7. The human-powered vehicle component according to claim 1, wherein the transmission is a member separate from the crankshaft.

8. The human-powered vehicle component according to claim 1, wherein the third positioning portion includes a third mark.

9. The human-powered vehicle component according to claim 8, wherein the third mark includes at least one of a third imprint and a third print.

10. The human-powered vehicle component according to claim 1, further comprising a housing that rotatably supports the crankshaft.

11. The human-powered vehicle component according to claim 10, further comprising a motor that assists in propulsion of a human-powered vehicle, the motor being provided at the housing and configured to drive the transmission.

12. The human-powered vehicle component according to claim 1, wherein the sprocket includes a first sprocket and a second sprocket having a smaller diameter than the first sprocket, and at least one of the first sprocket and the second sprocket includes at least one region that facilitates movement of a chain between the first sprocket and the second sprocket.

13. The human-powered vehicle component according to claim 12, wherein in a state in which the crank arm is coupled to the first coupling portion so that the crank arm is located at the first predetermined relative phase position with respect to the crankshaft in the circumferential direction about the rotational center axis and the at least one of the first sprocket and the second sprocket is coupled to the second coupling portion so that the at least one of the first sprocket and the second sprocket is located at the second predetermined relative phase position with respect to the crankshaft in the circumferential direction about the rotational center axis, as viewed in a direction parallel to the rotational center axis, the shift region is located in at least one of a position proximate to the crank arm and a position proximate to a position separated by 180° from the crank arm in the circumferential direction about the rotational center axis.

14. The crank arm attachment structure recited in claim 1, wherein the at least one first positioning recess and/or at least one first positioning projection includes a pair of first positioning recesses or a pair of first positioning projections, and the hole is positioned on one of the pair of first positioning recesses or one of the pair of first positioning projections.

15. The crank arm attachment structure recited in claim 14, wherein the at least one first positioning recess and/or at least one first positioning projection includes a pair of first positioning projections, and the hole is positioned on one first positioning projection of the pair of first positioning projections.

* * * * *